United States Patent
Shepherd et al.

(10) Patent No.: US 9,887,949 B2
(45) Date of Patent: Feb. 6, 2018

(54) DISPLAYING INTERACTIVE NOTIFICATIONS ON TOUCH SENSITIVE DEVICES

(71) Applicant: Apple Inc., Cupertino, CA (US)

(72) Inventors: Matthew E. Shepherd, Mountain View, CA (US); Michael Rhett Dickson, San Francisco, CA (US); Stephen O. Lemay, Palo Alto, CA (US); Freddy A. Anzures, San Francisco, CA (US); Richard R. Dellinger, San Jose, CA (US); Tomiwa Alabi, San Francisco, CA (US); Lawrence Y. Yang, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 319 days.

(21) Appl. No.: 14/502,974

(22) Filed: Sep. 30, 2014

(65) Prior Publication Data
US 2015/0350147 A1    Dec. 3, 2015

Related U.S. Application Data

(60) Provisional application No. 62/006,122, filed on May 31, 2014.

(51) Int. Cl.
*G06F 3/048* (2013.01)
*H04L 12/58* (2006.01)
(Continued)

(52) U.S. Cl.
CPC ............ *H04L 51/24* (2013.01); *G06F 3/0482* (2013.01); *G06F 3/0488* (2013.01);
(Continued)

(58) Field of Classification Search
CPC ..................................... G06F 3/0481–3/04883
See application file for complete search history.

(56) References Cited

U.S. PATENT DOCUMENTS

| 7,996,045 | B1 * | 8/2011 | Bauer | G06F 3/0488 455/466 |
| 2002/0057285 | A1 * | 5/2002 | Nicholas, III | G06F 3/04812 715/700 |

(Continued)

FOREIGN PATENT DOCUMENTS

| EP | 2369820 | A2 | 9/2011 |
| EP | 2381661 | A1 | 10/2011 |

(Continued)

OTHER PUBLICATIONS

PCT International Search Report and Written Opinion for PCT Application No. PCT/US2015/028626, dated Nov. 2, 2015, 38 pages.

(Continued)

*Primary Examiner* — Claudia Dragoescu
(74) *Attorney, Agent, or Firm* — Morgan, Lewis & Bockius LLP

(57) ABSTRACT

Methods and devices display an interactive notification element at an electronic device. The method comprises detecting an occurrence of an event associated with an application. In response to detecting the occurrence of the event, a notification element is displayed. A user of the device inputs a sequence of one or more gestures to reveal actions he can take in response to the notification element. The device then displays a plurality of action option UI elements, the selection of each action option UI element causing the application to perform a different action.

22 Claims, 31 Drawing Sheets

(51) Int. Cl.
*G06F 3/0484* (2013.01)
*G06F 3/0482* (2013.01)
*G06F 3/0488* (2013.01)

(52) U.S. Cl.
CPC .......... *G06F 3/04842* (2013.01); *H04L 51/02* (2013.01); *H04L 51/10* (2013.01); *H04L 51/22* (2013.01)

(56) References Cited

U.S. PATENT DOCUMENTS

| | | | |
|---|---|---|---|
| 2005/0198143 A1 | 9/2005 | Moody et al. | |
| 2008/0294730 A1 | 11/2008 | Oral et al. | |
| 2009/0177981 A1* | 7/2009 | Christie | G06F 3/04883 715/758 |
| 2010/0125801 A1* | 5/2010 | Shin | G06F 1/1616 715/758 |
| 2010/0159994 A1 | 6/2010 | Stallings et al. | |
| 2010/0250682 A1 | 9/2010 | Goldberg et al. | |
| 2011/0043469 A1* | 2/2011 | Kim | H04M 1/7258 345/173 |
| 2011/0167382 A1 | 7/2011 | van Os | |
| 2012/0022872 A1* | 1/2012 | Gruber | G06F 17/279 704/270.1 |
| 2012/0185498 A1 | 7/2012 | Loofbourrow et al. | |
| 2012/0185797 A1* | 7/2012 | Thorsen | G06Q 10/00 715/784 |
| 2013/0007665 A1* | 1/2013 | Chaudhri | G06F 9/4443 715/830 |
| 2013/0145303 A1* | 6/2013 | Prakash | G06F 3/04883 715/779 |
| 2013/0246538 A1* | 9/2013 | Maimon | H04L 51/12 709/206 |
| 2013/0346882 A1 | 12/2013 | Shiplacoff et al. | |

FOREIGN PATENT DOCUMENTS

| | | | |
|---|---|---|---|
| EP | 2584770 A1 | 4/2013 | |
| EP | 2770761 A1 | 8/2014 | |
| WO | WO 2003/067497 A1 | 8/2003 | |
| WO | WO 2012/172164 A1 | 12/2012 | |
| WO | WO 2012/178121 A1 | 12/2012 | |
| WO | WO 2013/016045 A1 | 1/2013 | |

OTHER PUBLICATIONS

PCT International Search Report and Written Opinion for PCT Application No. PCT/US2015/029618, dated Sep. 11, 2015, 10 pages.

Taylor, C., "Mailbox Launches on Android," TechCrunch, Apr. 9, 2014, 1 page, [online] [Retrieved on Jul. 28, 2015] Retrieved from the Internet: <URL:https://www.youtube.com/watch?v=sgL9883T97U>.

Brodkin, J., "Review: In Windows 8.1, Mail is finally usable on tablets and desktops," Ars Technica, Oct. 17, 2013, 5 pages, [online] [Retrieved on Oct. 13, 2015] Retrieved from the Internet: <URL:http://arstechnica.com/information-technology/2013/10/review-in-windows-8-l-mail-is-finally-usable-on-tablets-and-desktops/>.

Iyer, S., "Google adds new chat box style compose and reply experience to Gmail," NDTV Gadgets360.com, Oct. 31, 2012, 1 page, [online] [Retrieved on Oct. 13, 2015] Retrieved from the Internet: <URL:http://gadgets.ndtv.com/internet/news/google-adds-new-chat-box-style-compose-and-reply-experience-to-gmail-286779>.

International Search Report and Written Opinion, dated Sep. 11, 2015, received in International Patent Application No. PCT/US2015/029618, 10 pages.

International Preliminary Report on Patentability, dated Dec. 6, 2016, received in International Patent Application No. PCT/US2015/029618, 8 pages.

Office Action, dated Jul. 25, 2017, received in European Patent Application No. 15722895.8, which corresponds with U.S. Appl. No. 14/502,974, 5 pages.

* cited by examiner

DISPLAYING INTERACTIVE NOTIFICATIONS ON TOUCH SENSITIVE DEVICES

CROSS-REFERENCE TO RELATED APPLICATION

This application claims the benefit of U.S. Provisional Application No. 62/006,122 filed on May 31, 2014, which is incorporated by reference in its entirety.

TECHNICAL FIELD

This relates generally to displaying interactive notifications on electronic devices with touch-sensitive surfaces, including but not limited to electronic devices with touch-sensitive surfaces that detect inputs for moving user interface objects.

BACKGROUND

Touch sensitive electronic devices allow a user to interact with the device via touches, taps, pinches and other hand gestures. These electronic devices generally provide notifications alerting users to certain events, where the notifications are simply displays of information (e.g., static icons). For example, a smart phone may display a notification element to a user to alert the user of a received text message. In some instances, the user may tap or otherwise select the notification element in order to launch the associated application, so that the user can reply to the text message. However, this method requires the user to open the associated application in the foreground in order to take an action. Therefore, a method to more efficiently perform actions in response to received notifications is required.

SUMMARY

An electronic device is configured to provide interactive notification elements of events. Upon the occurrence of an event at an electronic device, the electronic device displays an interactive notification elements to a user. The interactive notification element is responsive to a touch input and in response thereto provides one or more options to the user, each option associated with an action to respond to the notification. In some embodiments, the provided options do not require the application associated with the notification to be opened in the foreground. For example, a notification element for a received text message provides an option for the user to reply to the text message, and the action of replying to the text message does not require the text message application to be opened in the foreground. Enabling the user to interact with the interactive notification element without opening the associated application in the foreground increases the efficiency of the process of responding to a received notification element.

A method for displaying an interactive notification element at an electronic device comprises detecting an occurrence of an event associated with an application, such as a received text message for a text messaging application. In response to detecting the occurrence of the event, a notification element is displayed that includes information regarding the event, such as a preview of the text message and the sender of the text message. A user of the device inputs a sequence of one or more gestures to reveal actions he can take in response to the notification element. The device then displays a plurality of action option UI elements, the selection of each action option UI element causing the application to perform a different action. For the received text message notification element, the device displays a reply action and a delete action, in some embodiments.

A method for providing a method to reply to a received message in a notification element comprises receiving a message, then displaying a notification element that includes information about the received message. In some embodiments, the notification element includes a user interface (UI) element for initiating a reply to the message. Responsive to receiving a selection of the UI element, the user provides information for a user-generated reply to the message. For example, for the received text message notification element, the UI element is a text entry box in some embodiments. The user then types a message in the text entry box. Responsive to receiving a send input, the user-generated reply is provided for transmission. For example, the send input is a "send" button, in some embodiments. When the user is done typing the reply, he selects the "send" button, and the typed reply is provided to the text messaging application for transmission.

Finally, a method for registering notification element instances for an application comprises receiving from various applications registration messages. Each registration message associates the application with a notification element category and a mapping of one or more actions associated with the notification element category for one or more notification element contexts. The notification element instances for each of the applications are then registered, or stored. When a notification element is received from an application, the registered notification element instance associated with the application can be referenced to determine what actions to display with the notification element.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In embodiments described below, methods for displaying interactive notification elements are achieved by providing one or more action options with a interactive notification element dependent on the notification element category and notification element context. The provided action options allow a user to perform actions in response to the notification element. In some embodiments, the actions are performed in the background, meaning the corresponding application does not open a full user interface. This allows the user to more efficiently interact with applications via the interactive notification elements.

Figure 2:
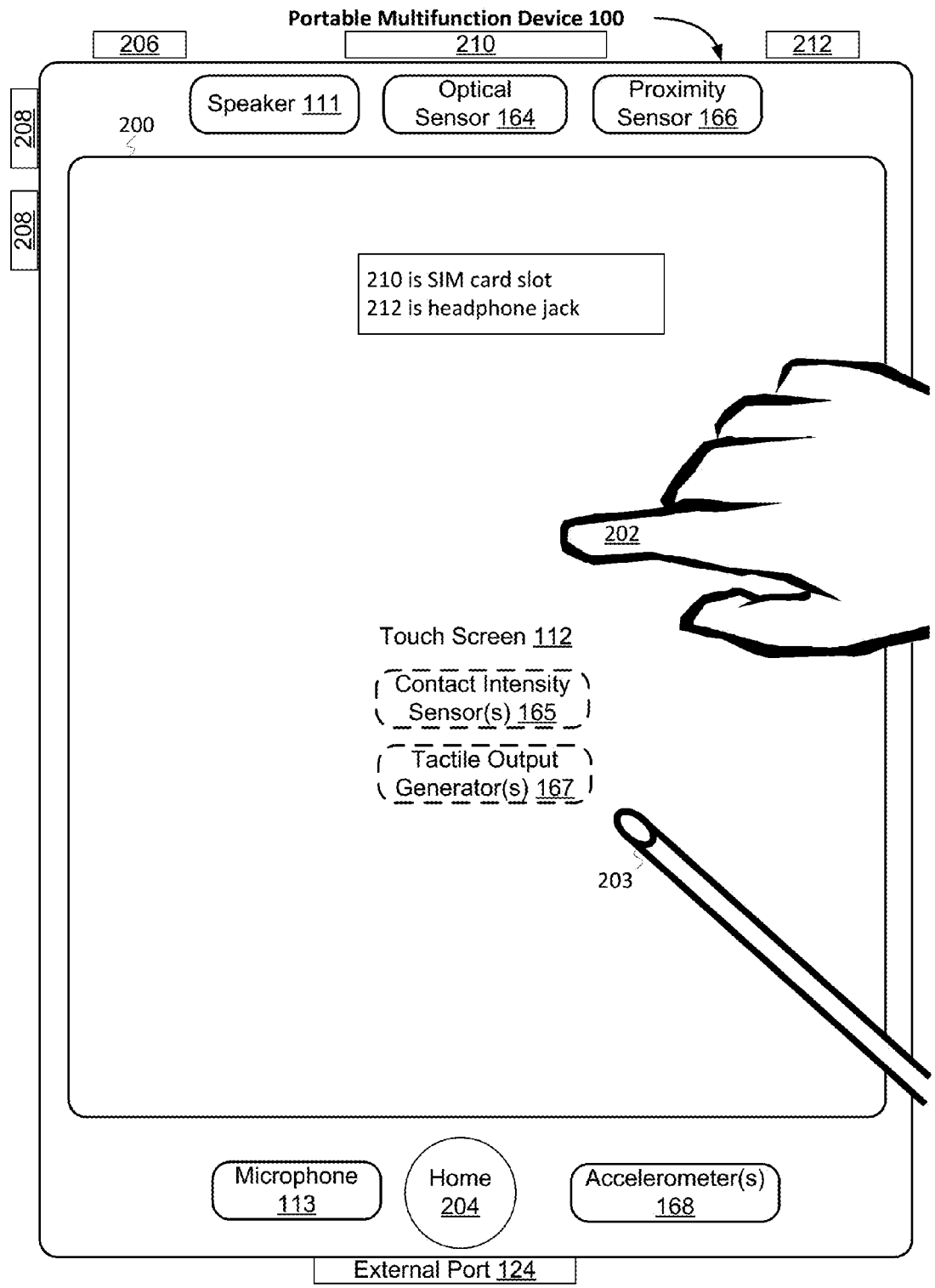
FIG. 2 illustrates a portable multifunction device having a touch screen in accordance with some embodiments.
Figure 3:
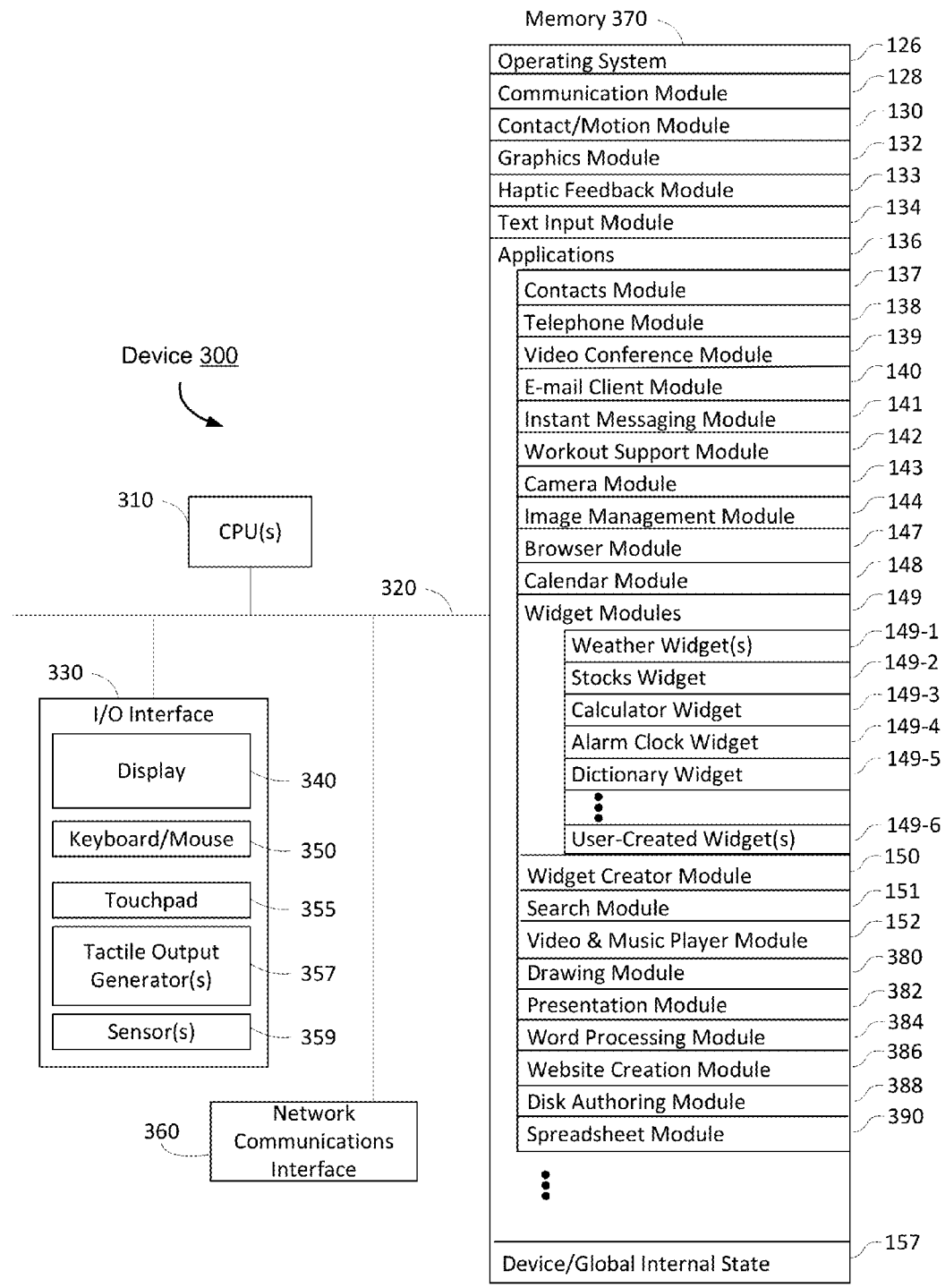
FIG. 3 is a block diagram of an exemplary multifunction device with a display and a touch-sensitive surface in accordance with some embodiments.
Figure 4A:
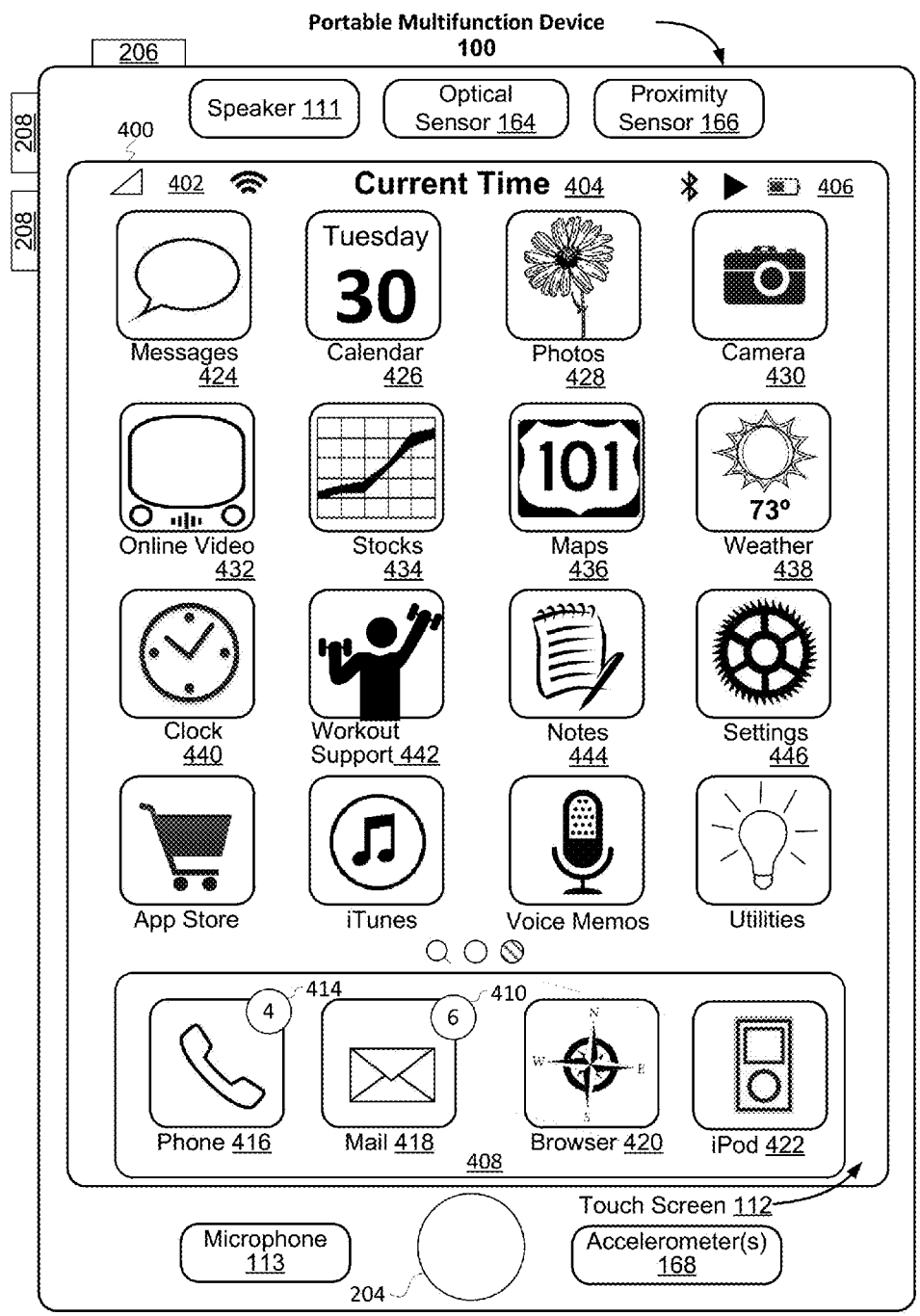
FIG. 4A illustrates an exemplary user interface for a menu of applications on a portable multifunction device in accordance with some embodiments.
Figure 4B:
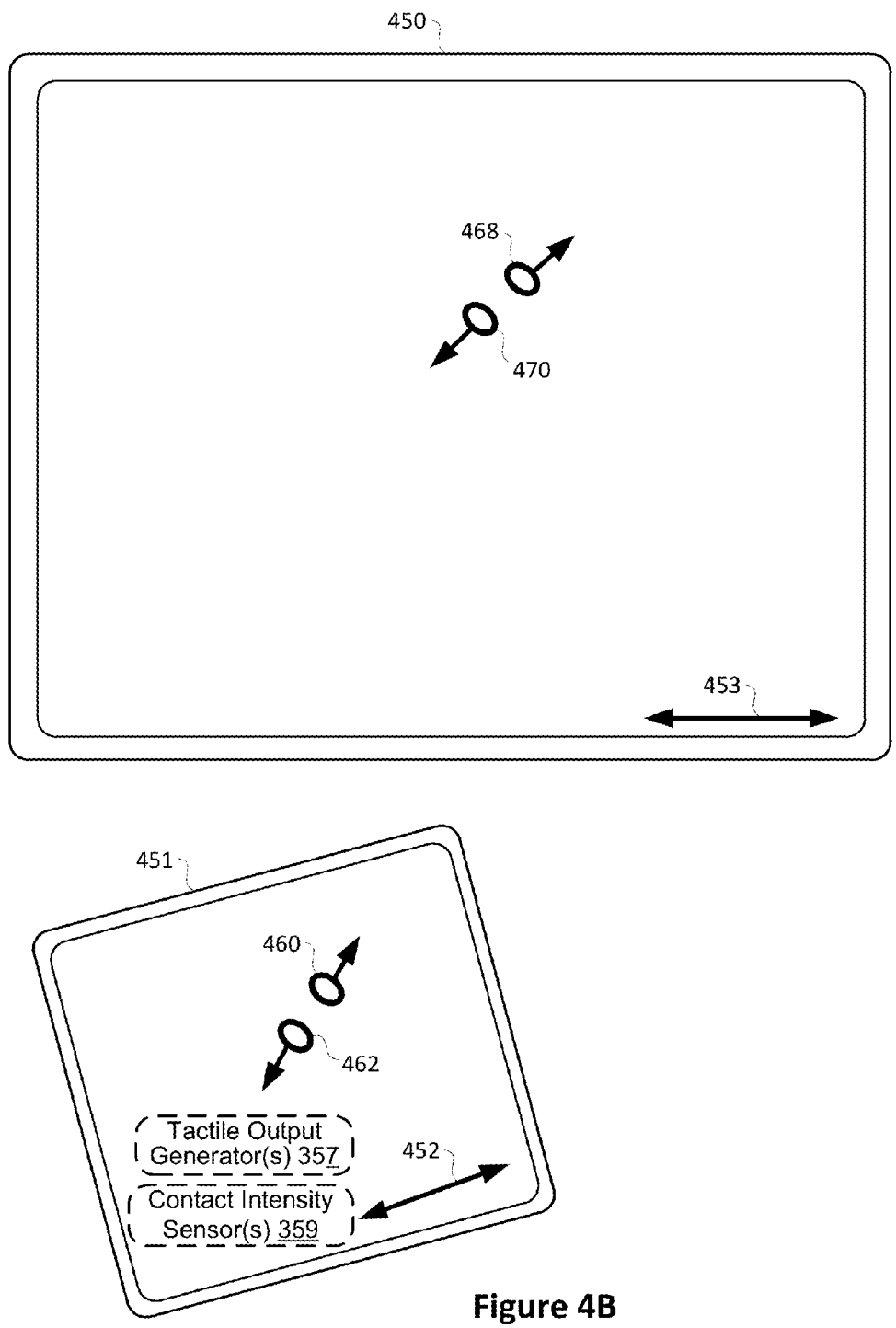
FIG. 4B illustrates an exemplary user interface for a multifunction device with a touch-sensitive surface that is separate from the display in accordance with some embodiments.
Figure 18A:
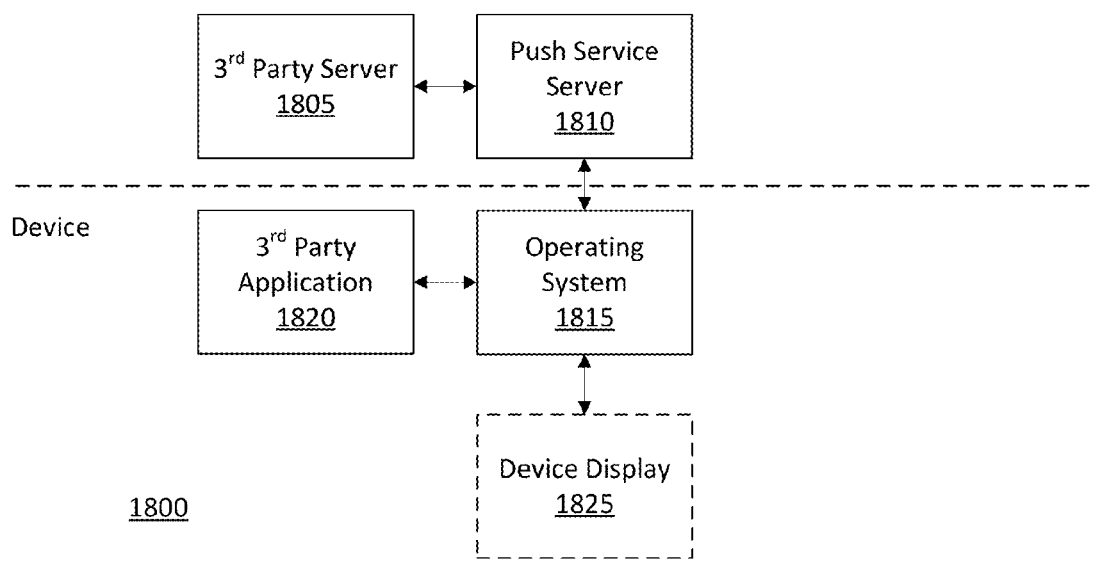
FIG. 18A illustrates a block diagram of a notification element system in accordance with some embodiments.
Figure 18B:
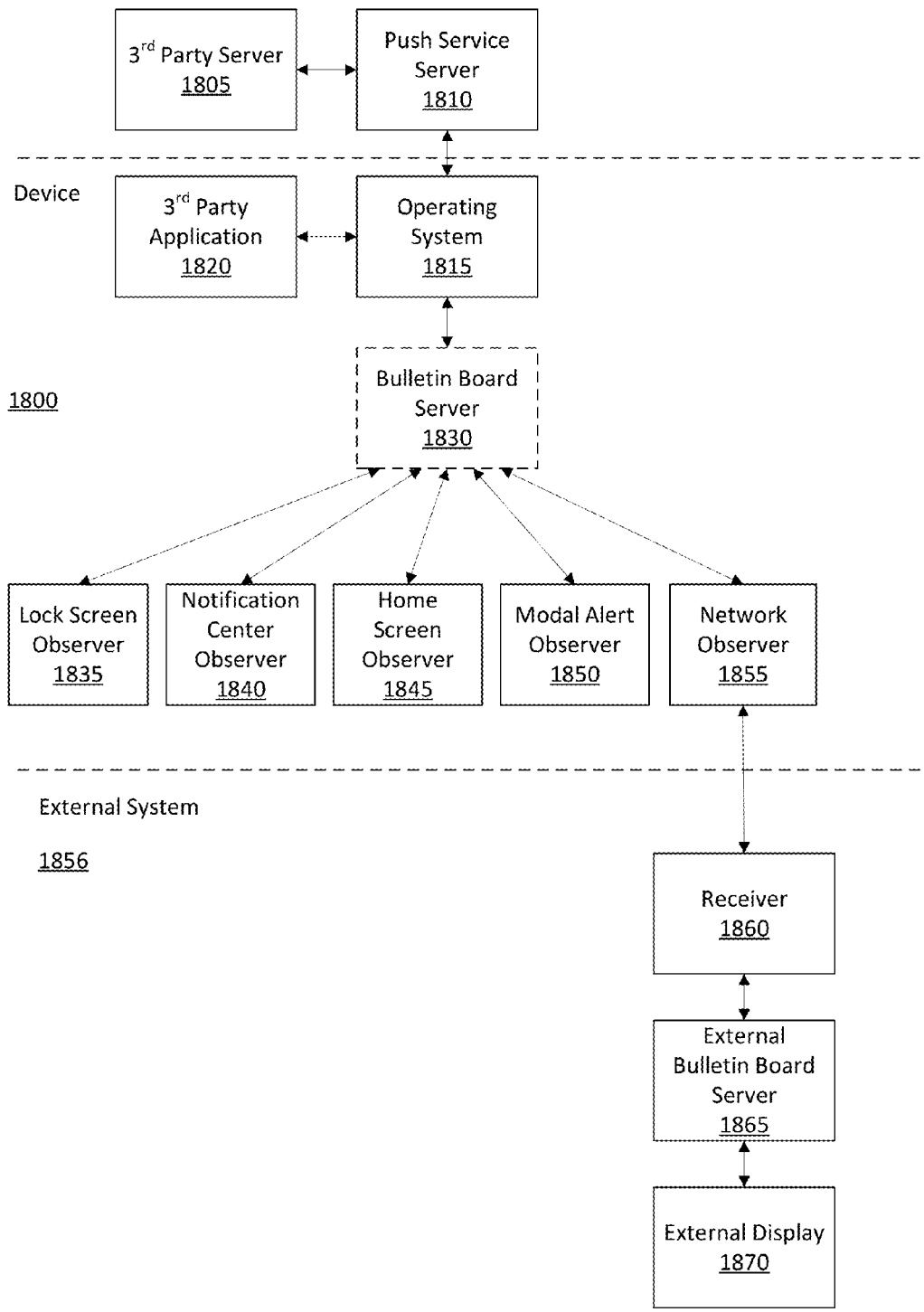
FIG. 18B illustrates a block diagram of a notification element system with an external system in accordance with some embodiments.
Figure 19:
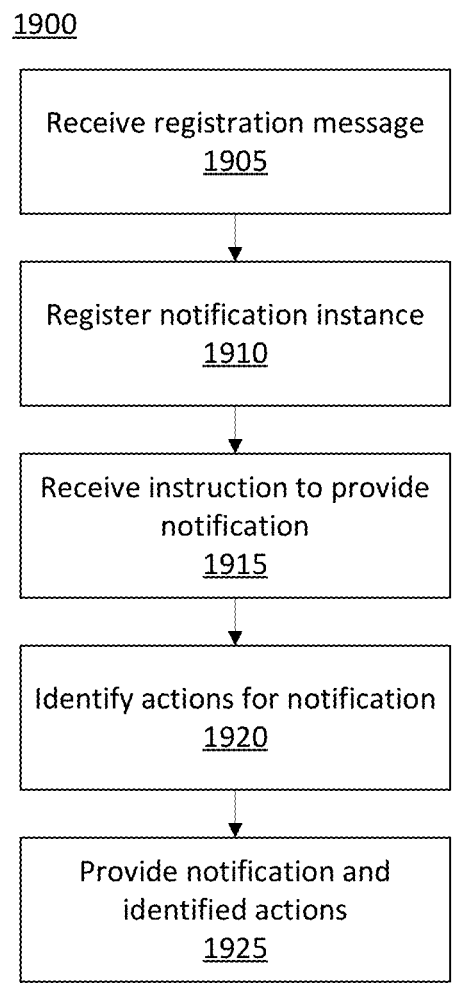
FIG. 19 is a flowchart illustrating a method for providing interactive notification elements in accordance with some embodiments.

Below, FIGS. 1A-1B, 2, and 3 provide a description of exemplary devices. FIGS. 4A-4B illustrate exemplary user interfaces for the exemplary devices. FIGS. 5-9 and 11-16 illustrate exemplary user interfaces for displaying various embodiments of interactive notification elements. FIGS. 18A and 18B illustrate block diagrams of notification element systems. FIG. 19 illustrates a flowchart for a method for providing interactive notification elements.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
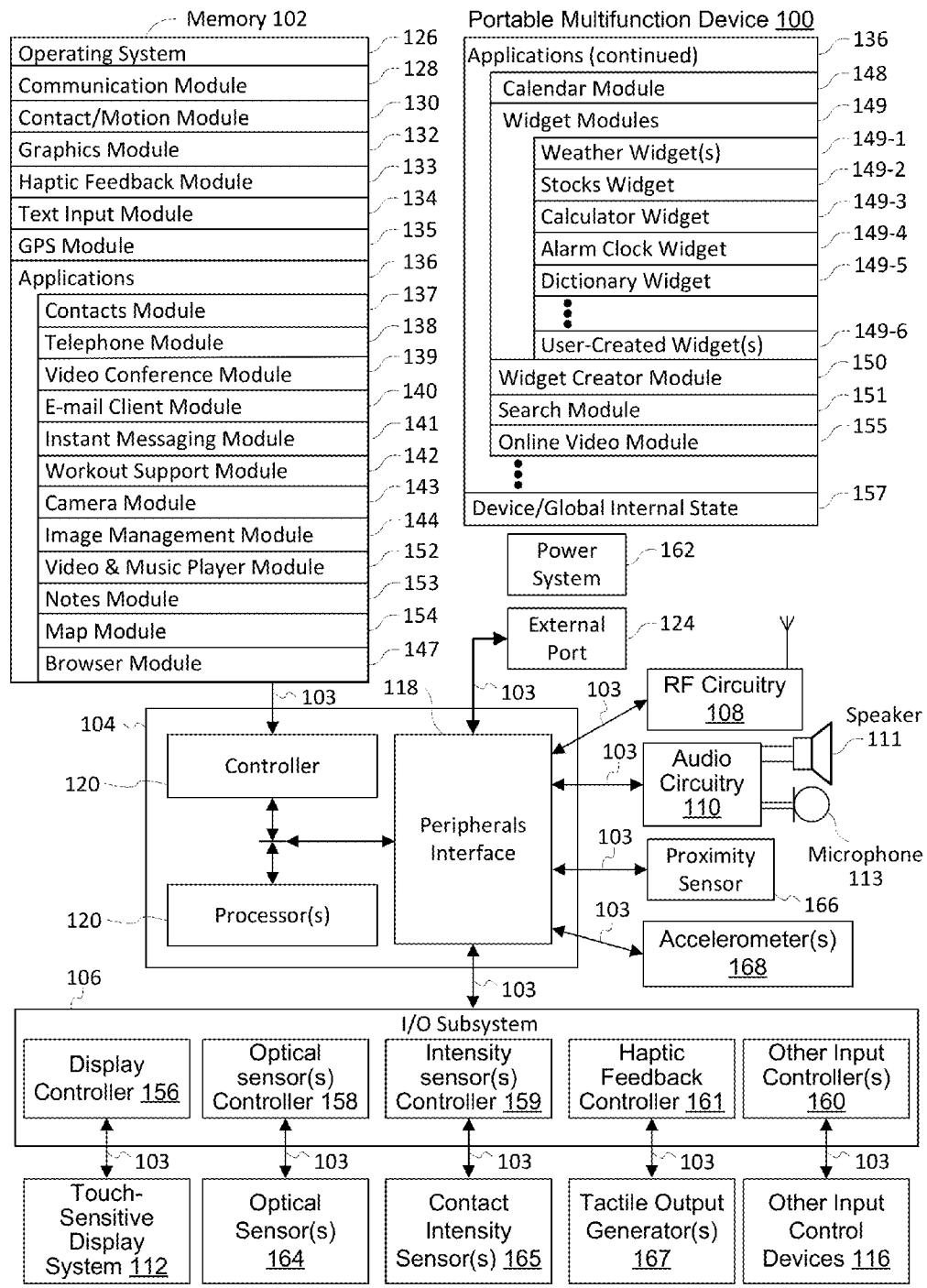
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pres sure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.1 la, IEEE 802.1 lb, IEEE 802.1lg and/or IEEE 802.1 ln), Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
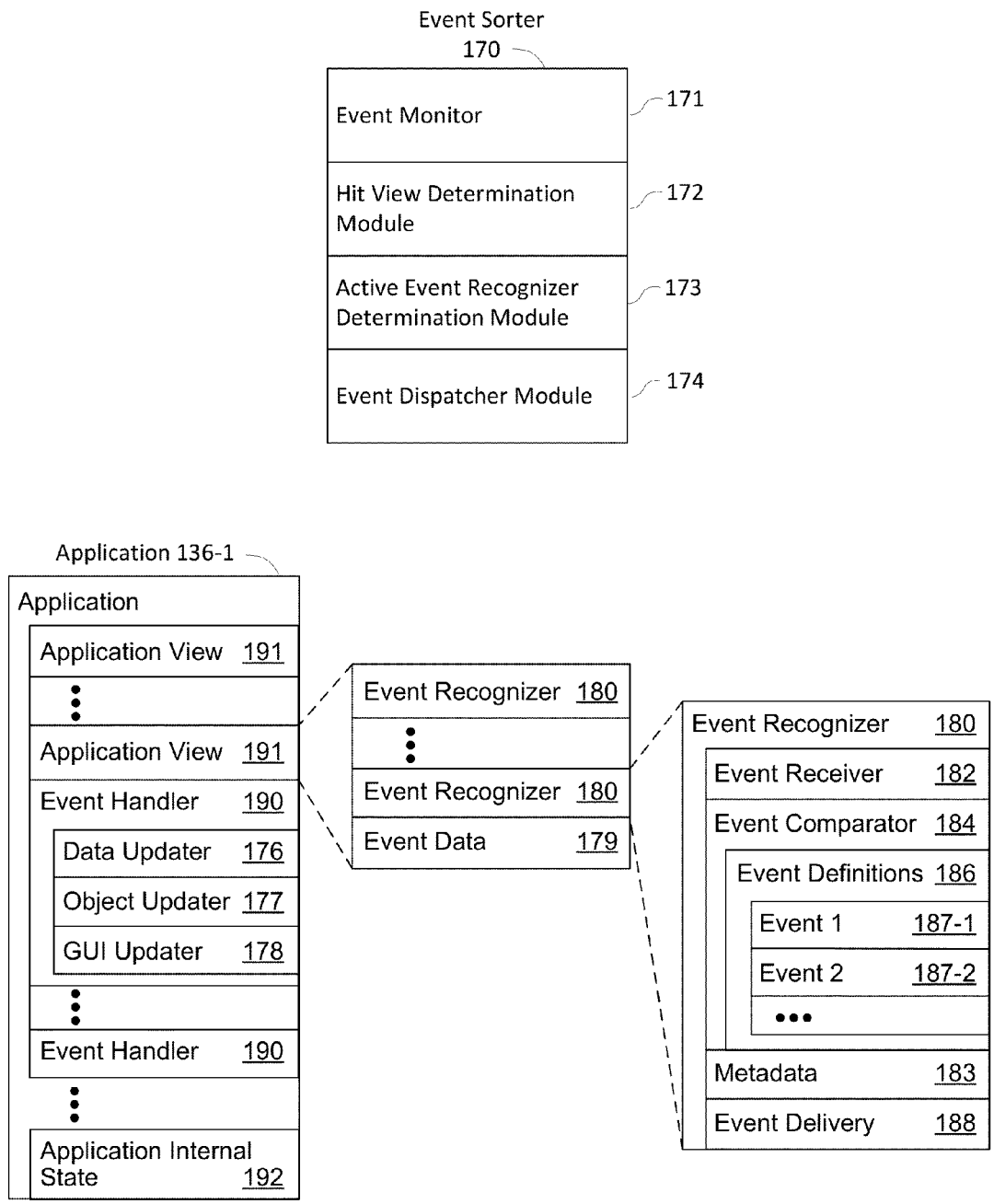
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device with a display and a touch-sensitive surface, such as device 300 or portable multifunction device 100. Alternatively, the UIs and processes described herein could be implemented on any other device type.

FIGS. 5-9 and 11-16 illustrate exemplary user interfaces for displaying interactive notification elements in accordance with some embodiments. The user interfaces in these figures are used to illustrate the processes described below, including the processes in FIGS. 10, 17, and 19.

Applications on a device, such as device 100, run in either a foreground mode or a background mode in some embodiments. When an application runs in the foreground, the application is the primary or only item displayed on the screen, such as touch screen 112 in FIG. 2. This allows a user to access all of the application's features. When an application runs in the background, the application is not the primary item displayed on the screen. In some embodiments, when an application is running in the background, the screen does not indicate that the application is running.

Interactive notification elements allow a user of a device, such as device 100, to interact with an application without necessarily opening the application in the foreground. A device displays a notification element on the screen to notify the user of an event in an application. In some embodiments, an event in an application is an action or state which require an input from the user, for example, the receipt of a message, such as a text message or an email. In other embodiments, an event in an application does not necessarily require an input from the user.

Interactive Notification Elements

Figure 5A:
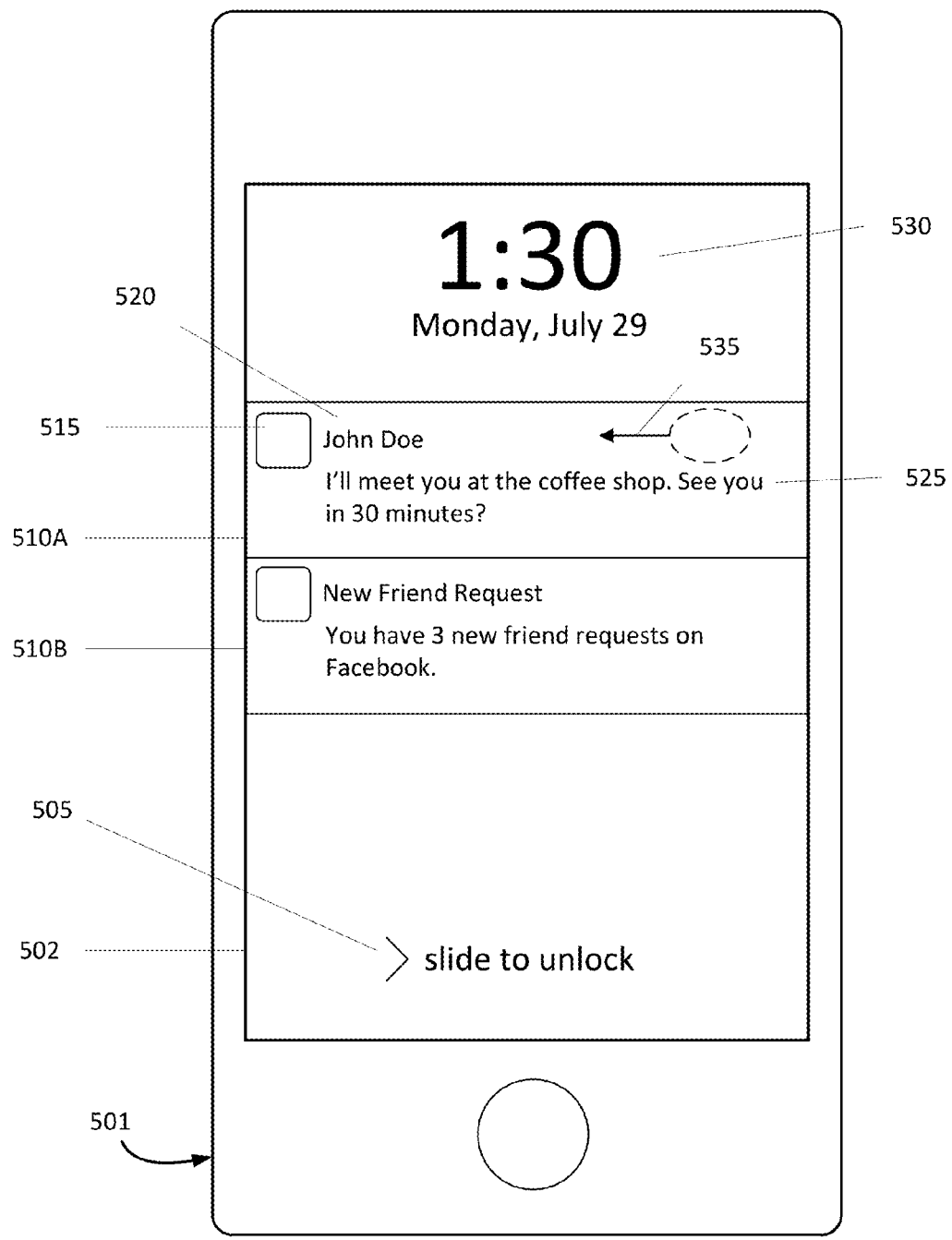
FIG. 5A illustrates an exemplary user interface for a lock screen notification element interface in accordance with some embodiments.
Figure 5B:
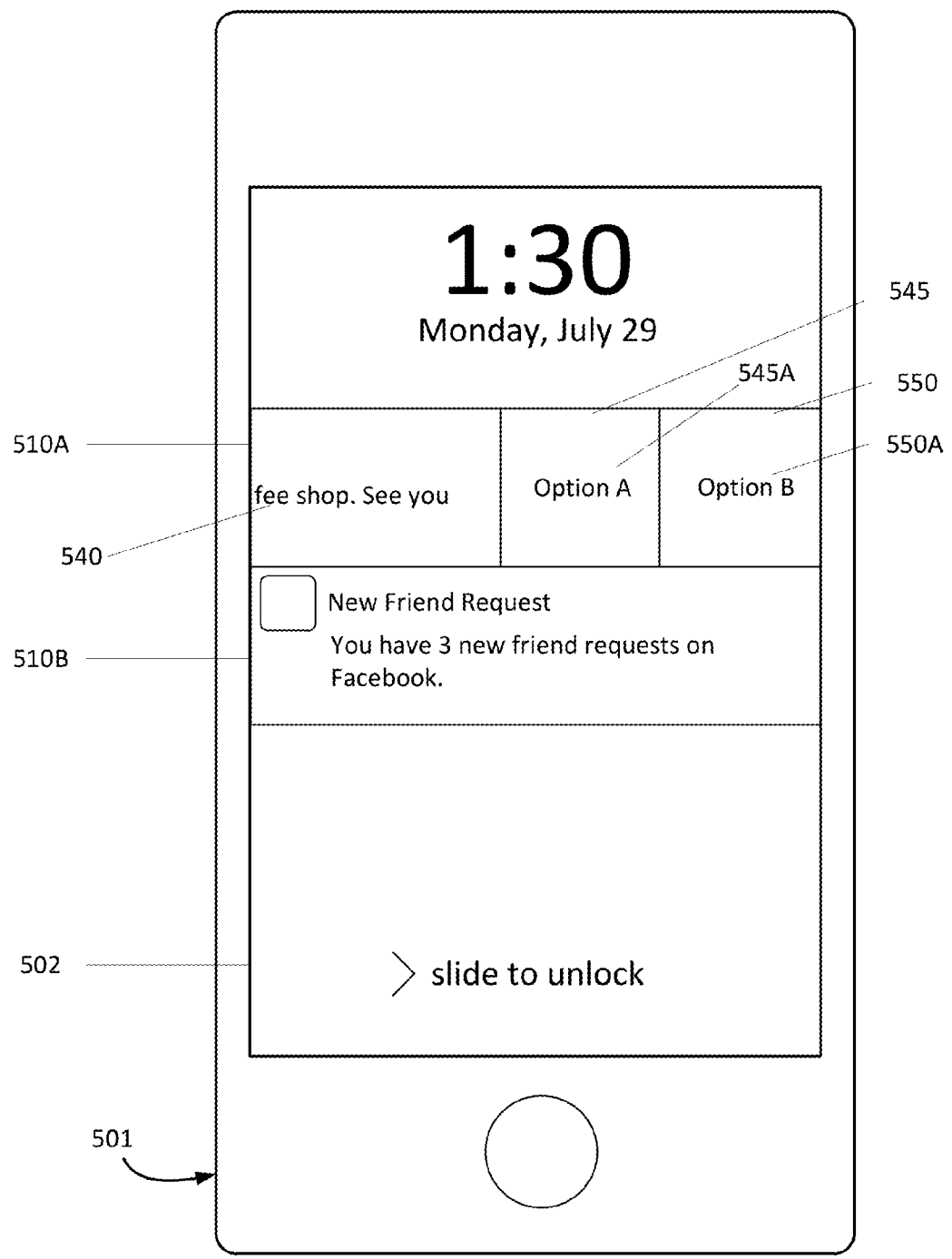
FIG. 5B illustrates an exemplary user interface for a lock screen notification element interface in accordance with some embodiments.

FIGS. 5A-5B illustrate an example user interface for interactive notification elements on a lock screen interface. FIG. 5A illustrates a device 501 displaying a lock screen on the screen 502. The lock screen further comprises an unlock user interface (UI) element 505, a first interactive notification element UI element 510A (also referred to as first interactive notification element 510A), a second interactive notification element UI element 510B (also referred to as second interactive notification element 510B), and time/date display 530. The unlock UI element further comprises an image of an arrow and a "slide to unlock" text. The user can input a gesture on the unlock UI element 505, such as a swipe in the direction of the arrow in order to unlock the device 501. The first interactive notification element 510A depicted in FIG. 5A is a text message notification element. The first interactive notification element 510A extends horizontally across the width of the screen 112 and further comprises an icon 515, a header 520, and a main content 525. The icon 515 can be an image representative of the corresponding application. For example, the icon 515 displays an image associated with the messaging application. In other embodiments, if the notification element is associated with a second person that is not the user of the device (for example, receipt of an email from a friend of the user), the icon 515 is an image associated with the second person, such as a profile picture. The header 520 is text providing information about the notification element. For example, for the text message notification element, the header 520 is the name of the message sender. The main content 525 displays further information regarding the notification element. For the text message notification element, the main content 525 is the actual text message itself, or a portion thereof.

The user can interact with the interactive notification elements 510A to display one or more options for interacting with the notification element or the associated application. For example, responsive to receiving a swipe input to the left on the interactive notification element 510A, one or more option UI elements are displayed, as described below with reference to FIG. 5B. In some embodiments, receiving a tap input on the interactive notification element 510A launches the associated application. The second interactive notification element 510B comprises similar or identical elements as the first interactive notification element 510A. Although two interactive notification elements 510 are depicted in FIG.

5A, the lock screen may display more or fewer interactive notification elements. To display one or more option UI elements 545 and 550 as described below, the user swipes left on the first interactive notification element 510A as depicted by the arrow 535 in order to reveal two option UI elements 545 and 550 (FIG. 5B). In some embodiments, the swipe input from the user comprises contact on the screen 502 and a continuous movement past a threshold.

FIG. 5B illustrates the lock screen displayed on the device 501 in FIG. 5A, but with the first interactive notification element 510A displaying additional options for interacting with the associated application, in accordance with one embodiment. The swipe input from the user described above causes the entire first interactive notification element 510A to move to the left on the screen 502 such that only part of the first interactive notification element content 540 is visible. In some embodiments, if the continuous movement does not exceed the threshold, the first interactive notification element 510A move back to its original position on the screen 502. The option UI elements 545 and 550 are displayed in the area of the lock screen interface that is no longer occupied by the first interactive notification element 510A. The option UI element 545 further comprises text 545A that indicates an action associated with the option UI element 545. The option UI element 550 further comprises text 550A that indicates an action associated with the option UI element 550. In some embodiments, option UI element 545 is associated with a reply action, allowing the user to reply to the text message, and option UI element 550 is associated with a delete action, allowing the user to delete the text message. In this embodiment, the text 545A comprises the word "Reply" and the text 550A comprises the word "delete." In other embodiments, different option UI elements 545 and 550 are be displayed depending on the notification element category and context, as further described below. Responsive to the user swiping right on the first interactive notification element 510A, the lock screen interface moves the first interactive notification element 510A back to the right and hides the option UI elements. The second interactive notification element 510B is still visible on the lock screen interface. Although two option UI elements are displayed in Fig. B, more or fewer option UI elements may be displayed in other embodiments.

In some embodiments, selecting certain options displayed on the lock screen interface requires the user to input a passcode. For example, actions such as replying to a text message or deleting an email may require the user to input a passcode, in order to prevent non-authorized users from taking substantial actions on the device 501. However, an action such as reading a text message may not require passcode verification, because the act of reading the text message likely does not cause irreversible changes on the device 501. In some embodiments, once the user has entered a passcode once, the user may continue to interact with the interactive notification elements displayed on the lock screen without entering the passcode again. However, when the lock screen is closed (e.g., if the user turns off the screen 502 of the display 501, or it times out), the passcode is reset, and the user must enter the passcode again in order to perform an action that requires authentication. For example, a user selects to delete an email, and is prompted for a passcode. After the user enters the passcode, the user can perform other actions that require authentication, such as deleting another email, sending a text message, etc., without entering the passcode for each action. In some embodiments, the entered passcode remains "active" or "valid" for as long as the screen 502 is still on. In other embodiments, the passcode has a timeout feature, where the passcode becomes "invalid" or "inactive" after a specified amount of time has passed. In some embodiments, the screen 502 turns off automatically after a specified amount of time, thus requiring the user to re-input the passcode before performing additional actions that require authentication.

Figure 6:
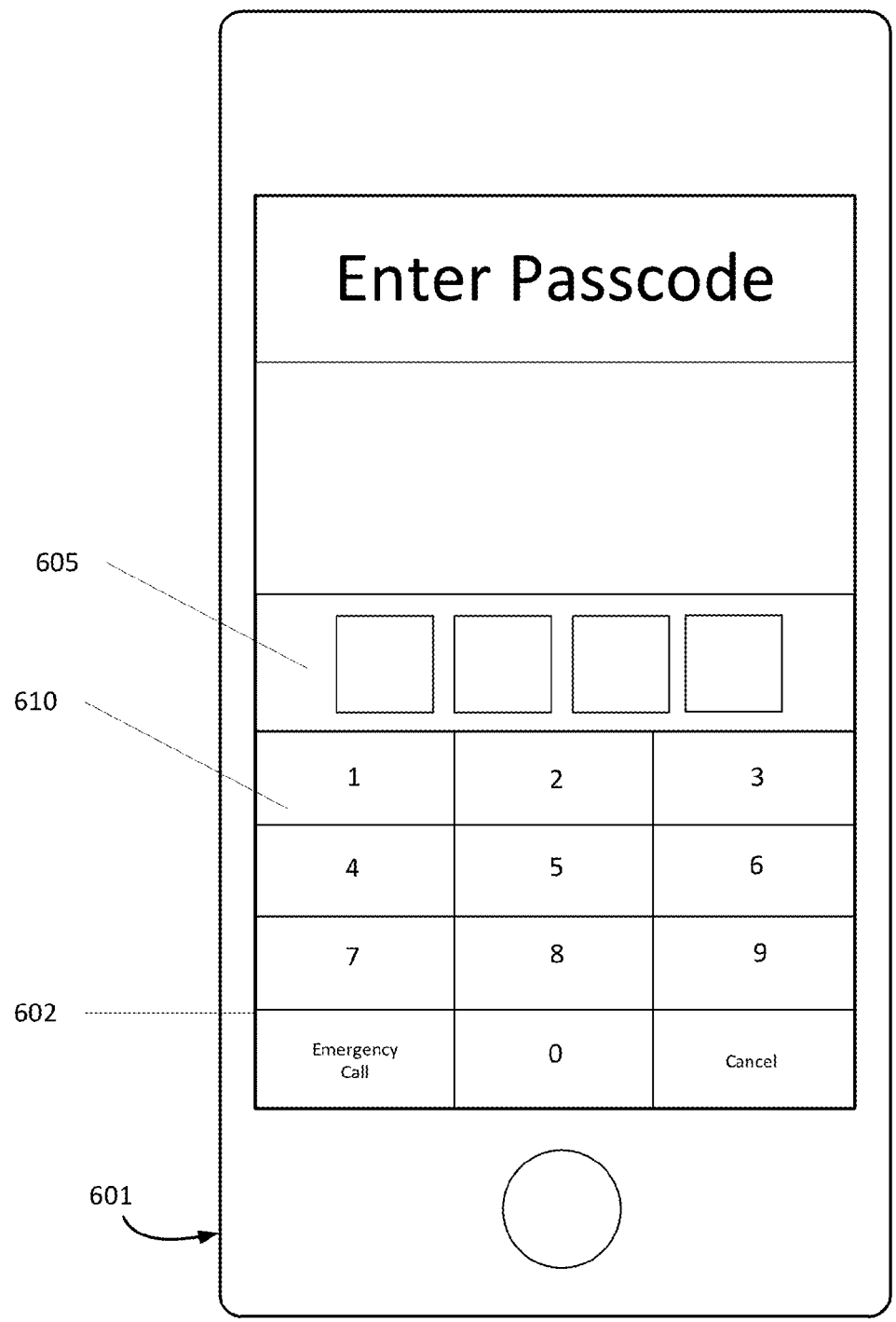
FIG. 6 illustrates an exemplary user interface for an authentication code entry interface in accordance with some embodiments.

FIG. 6 illustrates a passcode request interface, in accordance with some embodiments. The passcode request interface is displayed on a screen 602 of a device 601 and comprises a passcode display region 605 and a keypad 610. The keypad 610 allows the user to input a numerical passcode, and the passcode display region 605 displays each digit of the passcode as the user enters the passcode. In other embodiments, the keypad 610 may comprise letters in addition to numbers, to allow the user to input an alphanumerical passcode, and the passcode display region 605 hides the password characters as they are entered.

Figure 7A:
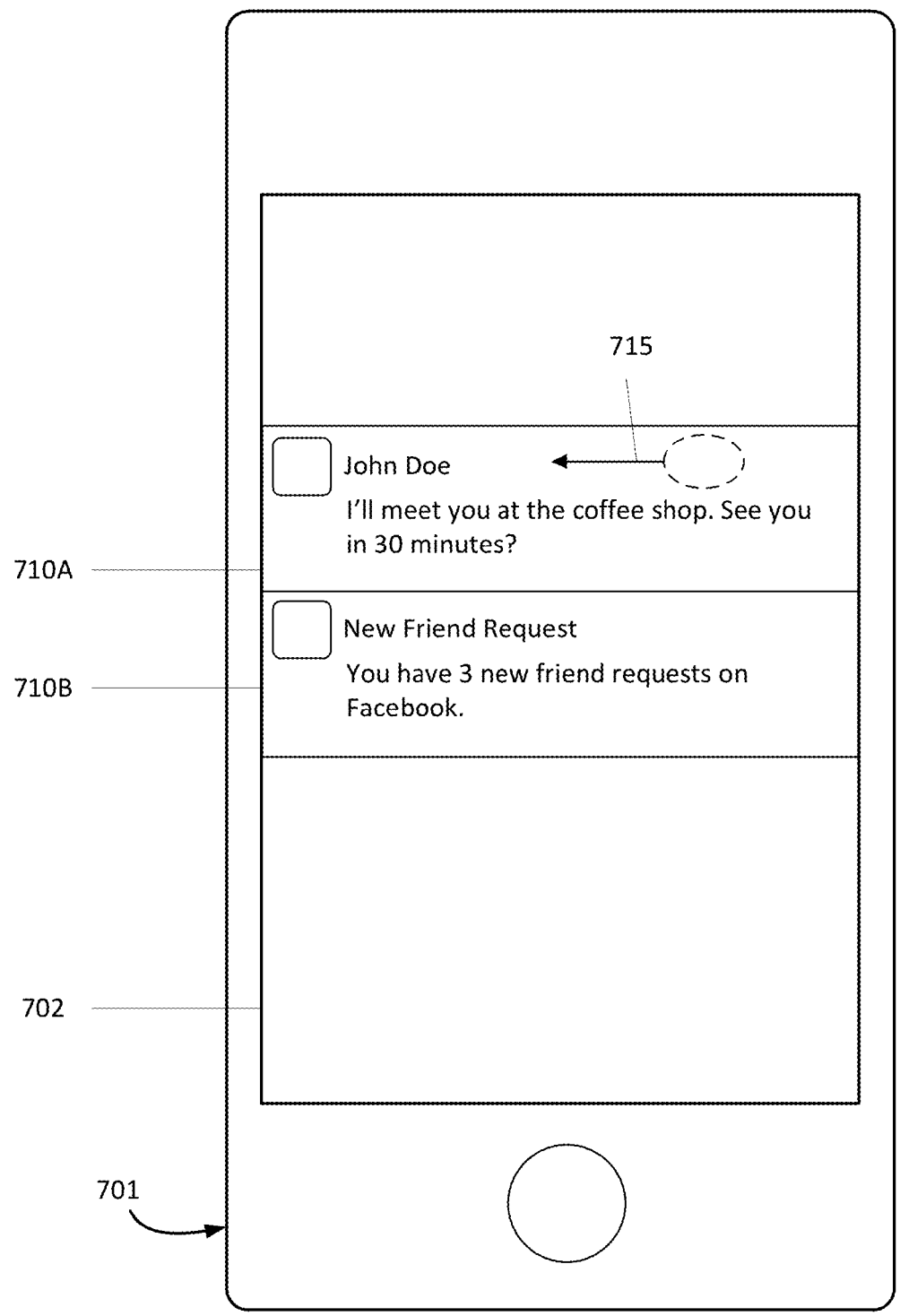
FIG. 7A illustrates an exemplary user interface for a notification element center interface in accordance with some embodiments.
Figure 7B:
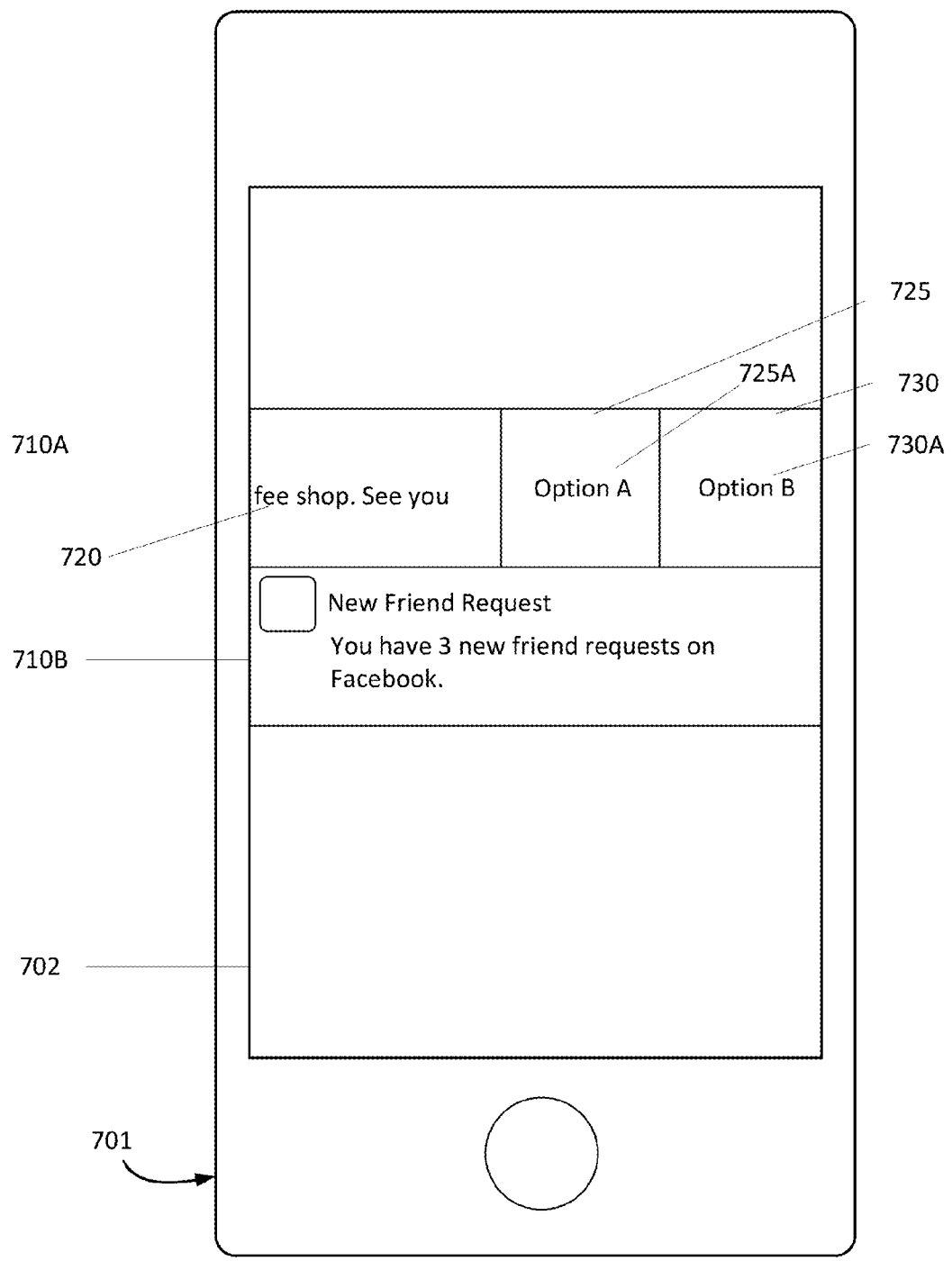
FIG. 7B illustrates an exemplary user interface for a notification element center interface in accordance with some embodiments.

FIGS. 7A-7B illustrate a user interface for interactive notification elements on a notification element center interface, displayed on a screen 702 of a device 701, in accordance with one embodiment. In some embodiments, the device 701 is device 100 and the screen 702 is screen 112. The interactive notification elements displayed in the notification element center interface are identical to the lock screen interface, except the notification element center interface does not require passcode authentication for the user. If the device 701 is displaying the notification element center interface, the user of the device 701 has already entered a passcode or is otherwise authorized to use the device 701. FIG. 7A illustrates a device 100 displaying a notification element center interface on the screen 702. The notification element center interface depicted in FIG. 7A is almost identical to the lock screen interface depicted in FIG. 5A, except that the notification element center interface does not include the unlock UI element 505 or the time/date display 530. The notification element center interface comprises interactive notification elements 710A and 710B, which are described above with reference to 510A and 510B in FIG. 5A and will not be described here further for brevity. In some embodiments, receiving a tap input on the interactive notification element 710A launches the associated application. To reveal the option UI elements 725 and 730 described below, the user swipes to the left as depicted by the arrow 715. The swipe motion 715 is similar to the motion described above with reference to FIG. 5A.

FIG. 7B illustrates the device 701 of FIG. 7A, but with the first interactive notification element 710A displaying additional options for interacting with the associated application, in accordance with one embodiment. The first interactive notification element 710A, interactive notification element content 720, and option UI elements 725 and 730 are similar to the analogous elements described above with reference to FIG. 5B, and will not be described here further for brevity.

Figure 8A:
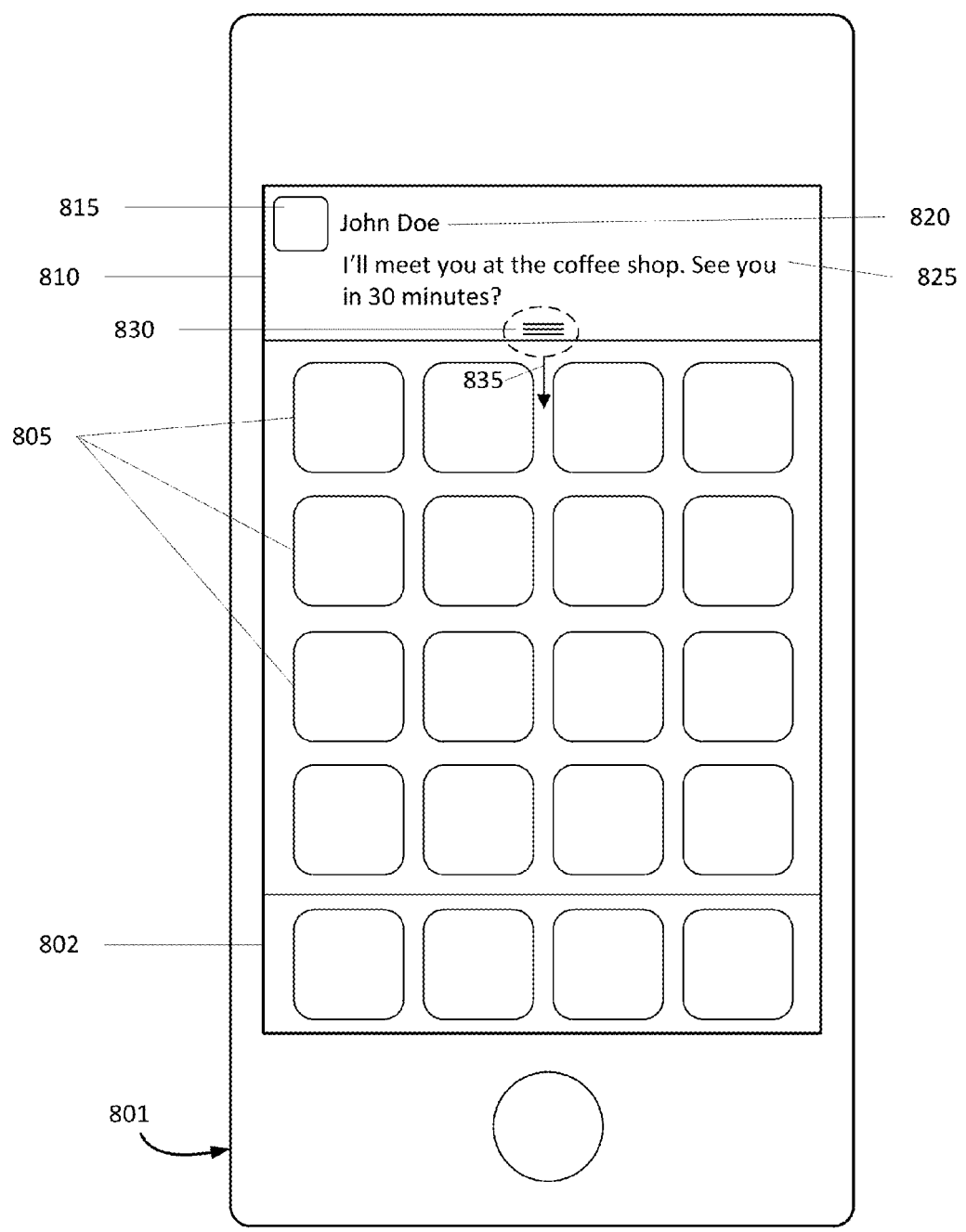
FIG. 8A illustrates an exemplary user interface for a home screen interface in accordance with some embodiments.
Figure 8B:
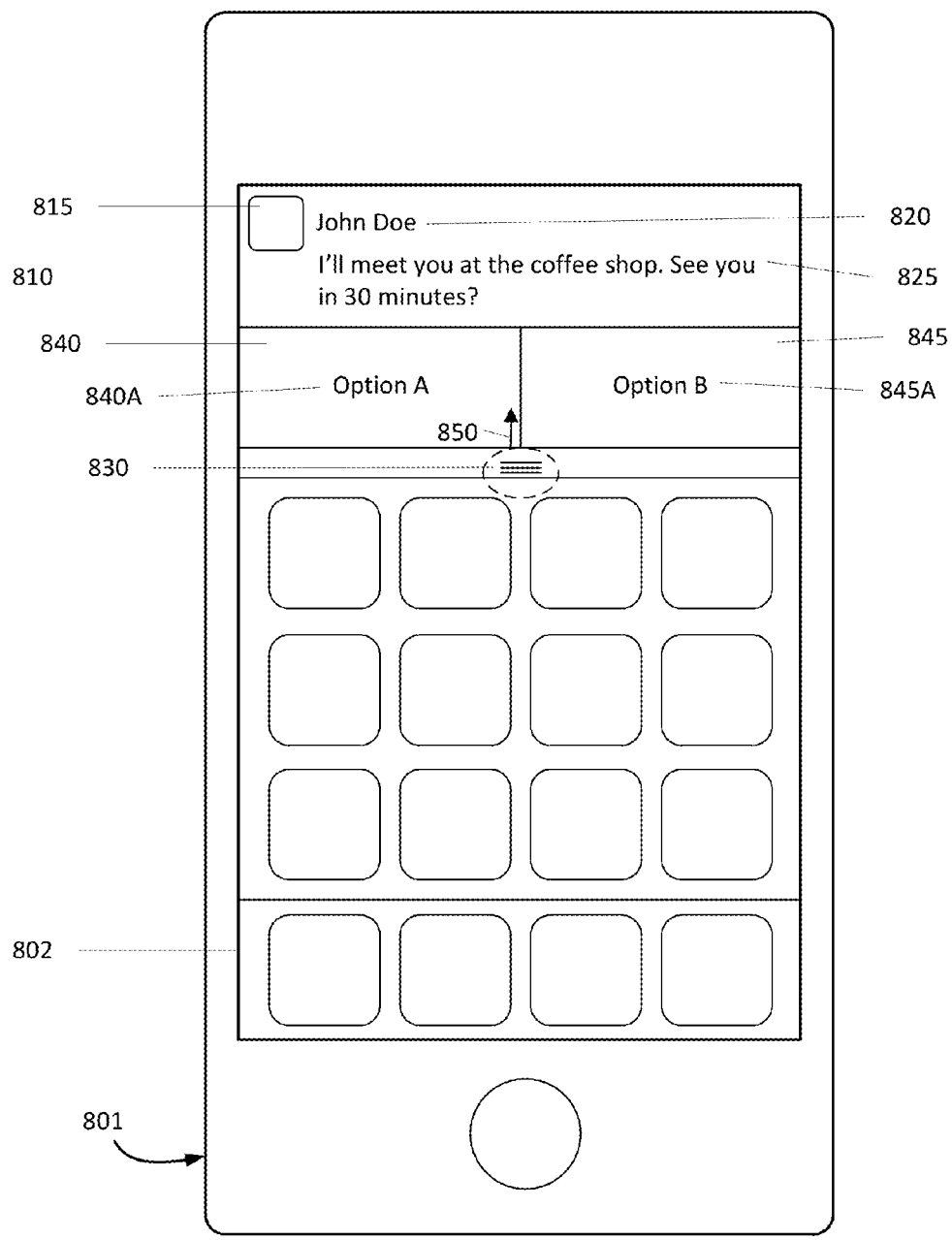
FIG. 8B illustrates an exemplary user interface for a home screen interface in accordance with some embodiments.

FIGS. 8A-8B illustrate interactive notification elements on a home screen interface, in accordance with one embodiment. FIG. 8A illustrates a device 801 displaying a home screen interface on a screen 802. In some embodiments, the device 801 is device 100 and the screen 802 is screen 112. The home screen interface comprises application icons 805 and an interactive notification element banner 810. The application icons 805 are further described above with reference to FIG. 4A. The interactive notification element banner 810 depicted in FIG. 8A is a text message notification element. The interactive notification element banner 810 is located at the top of the screen 112, extends across the width of the screen 802, and further comprises an icon 815, a header 820, a main content 825, and a pull-down UI element

830. The icon 815, header 820, and main content 825 are similar to the icon 515, header 520, and main content 525 described above with reference to FIG. 5A, and will not be further described here for brevity. In some embodiments, receiving a tap input or other contact on the interactive notification element banner 810 launches the associated application. To reveal the option UI elements depicted in FIG. 8B, the user swipes downward on the pull-down UI element 830, as depicted by the arrow 835. The swipe input is described above with reference to FIG. 5A.

FIG. 8B illustrates the device 801 of FIG. 8A, but with the interactive notification element banner 810 displaying additional options for interacting with the associated application, in accordance with one embodiment. Responsive to the user swiping downward on the pull-down tab UI element 830, as depicted by the arrow 835, the home screen interface reveals one or more option UI elements on the interactive notification element banner 810. The interactive notification element banner 810 now further comprises option UI elements 840 and 845. The option UI element 840 further comprises text 840A that indicates an action associated with the option UI element 840. The option UI element 845 further comprises text 845A that indicates an action associated with the option UI element 845. In some embodiments, because the interactive notification element banner is depicted as a text message notification element, option UI element 840 is associated with a reply action, allowing the user to reply to the text message, and option UI element 845 is associated with a delete action, allowing the user to delete the text message. In this example, the text 840A comprises the word "Reply" and the text 845A comprises the word "delete." In other embodiments, different option UI elements 840 and 845 are displayed depending on the notification element category and context, as further described below. Responsive to the user swiping upward on the pull-down UI element 830, as depicted by arrow 850, the home screen interface hides the option UI elements.

Figure 9A:
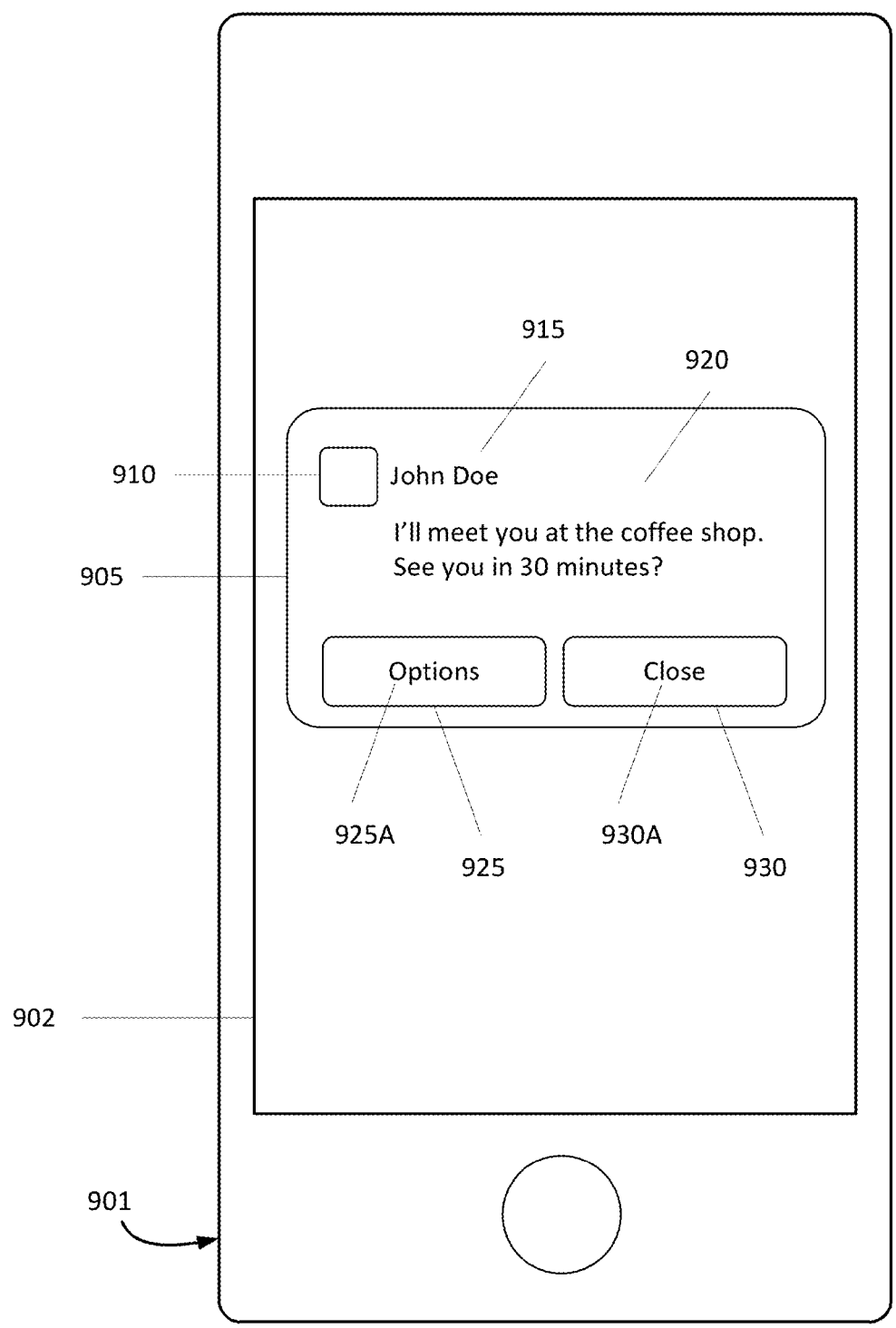
FIG. 9A illustrates an exemplary user interface for a modal alert interface in accordance with some embodiments.
Figure 9B:
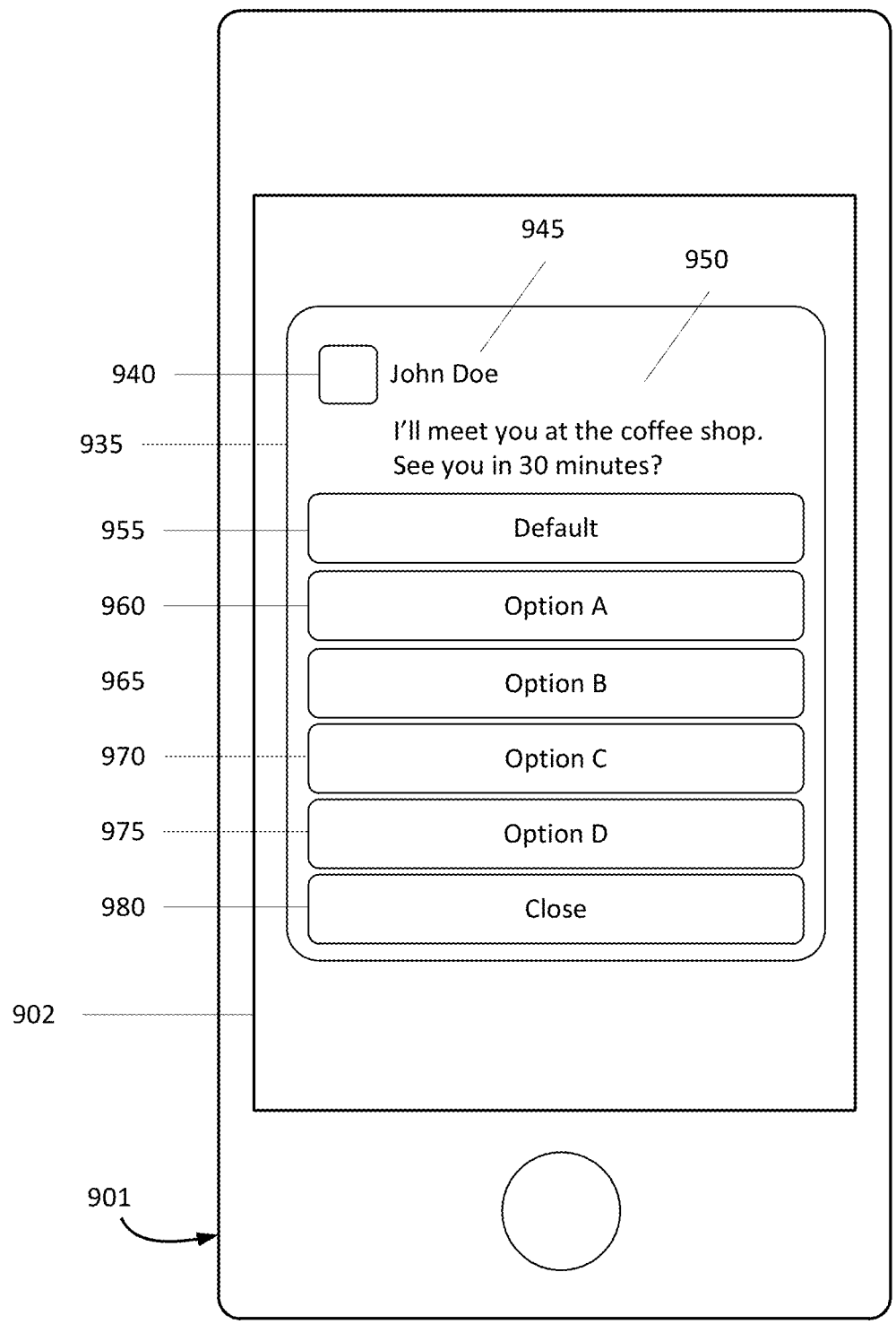
FIG. 9B illustrates an exemplary user interface for a modal alert interface in accordance with some embodiments.

FIGS. 9A-9B illustrate a user interface for interactive notification elements on a modal alert interface, in accordance with one embodiment. The modal alert interface comprises a modal alert 905 displayed near the center of the screen 902 of device 901. In some embodiments, the device 901 is device 100 and the screen 902 is screen 112. In some embodiments, the modal alert 905 is displayed in the foreground and obscures any applications or interfaces that are displayed in the background. The modal alert 905 further comprises an icon 910, a header 915, a main content 920, and option UI elements 925 and 930. The icon 910, header 915, and main content 920 are similar to the icon A10, header 515, and main content 520 described above with reference to FIG. 5A and will not be further described here for brevity. Unlike the lock screen interface (FIGS. 5A-5B), notification element center interface (FIGS. 7A-7B), or home screen interface (FIGS. 8A-8B), the modal alert interface automatically displays one or more option UI elements without receiving an input from the user. The option UI element 925 further comprises text 925A that indicates an action associated with the option UI element 925. The close UI element 930 further comprises text 930A that indicates an action associated with the close UI element 930. In some embodiments, the option UI element 925 is associated with displaying one or more additional option UI elements associated with the corresponding application, as described below with reference to FIG. 9B. The close UI element 930 is associated with closing the modal alert 905, thus ceasing to display the modal alert 905 in the foreground.

FIG. 9B illustrates the device 901 of FIG. 9A, but with an options sheet 935 displayed over the modal alert responsive to the user selecting the option UI element 925. Similar to the modal alert 905, the options sheet 935 comprises an icon 940, a header 945, and content 950. In some embodiments, the options sheet 935 displays six total option UI elements 955, 960, 965, 970, 975, and 980. The option UI element 955 is a "default" option and is associated with launching the corresponding application, in some embodiments. Option UI elements 960, 965, 970, and 975 are each associated with different actions for the corresponding application, depending on the notification element category and context as described below. Option UI element 980 serves a similar function to the close option UI element 930. Because the modal alert interface provides more surface area on the screen 902, the modal alert 905 displays a greater number of options than the other interactive notification elements described above. Although 6 total option UI elements are depicted in FIG. 9B, the modal alert interface may display more or fewer option UI elements in other embodiments.

Figure 10:
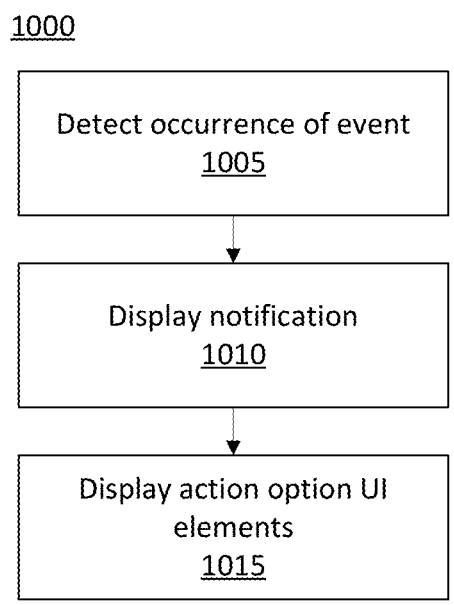
FIG. 10 is a flowchart illustrating a method for providing interactive notification elements in accordance with some embodiments.

FIG. 10 is a flowchart illustrating a method 1000 for providing interactive notification elements in accordance with some embodiments. First, an occurrence of an event is detected 1005. In some embodiments, the event is associated with an application. Then, in response to detecting the occurrence of the event, a notification element is displayed in a first area of a user interface 1010. The notification element comprises information about the event. In some embodiments, the displayed notification element is similar to the notification elements depicted in FIGS. 5-9 and 11-16 and described above. For example, the notification element can be a lock screen notification element (FIGS. 5A-5B), a notification element center notification element (FIGS. 7A-7B), a home screen notification element (FIGS. 8A-8B), or a modal alert notification element (FIGS. 9A-9B).

Finally, responsive to detecting a first sequence of one or more gestures in the first area of the user interface, a plurality of action option UI elements is displayed 1015. In some embodiments, the event is a received message, and the displayed action option UI elements comprise two or more of: a delete UI element, a mark-as-read UI element, a mark-as-favorite UI element, a reply UI element, a mark-as-spam UI element, and a move-to-folder UI element. In some embodiments, the first sequence of one or more gestures comprises a swipe gesture or a swipe gesture in the left direction. In some embodiments, the first sequence of one or more gestures comprises a swipe gesture in the downward direction (FIG. 8A).

In some embodiments, the notification element is scheduled to be removed from the display after being displayed for a predetermined amount of time and the method further comprises causing the notification element to be maintained on the display after the predetermined amount of time responsive to detecting a first sequence of one or more inputs. In some embodiments, the selection of each action option UI element causes the associated application to perform a different action. For example, the selection of a "delete" action option UI element for a received email notification element causes the associated email application to delete the received email. In some embodiments, the action performed in response to a selection of an action option UI element are performed without displaying the associated application in a second area of the user interface. In some embodiments, as described above with reference to FIG. 6, causing the application to perform an action further comprises requesting an authentication code from the user before proceeding to perform the action. For example, when the first action is a destructive action that is selected to be performed while the device is locked, the user is prompted to authenticate themselves to the device (e.g., by entering a passcode or providing biometric authentication such as a fingerprint) before the action is performed (FIG. 6).

In some embodiments, some or all of the action option UI elements comprise glyphs received from the application. For example, a delete action option UI element for a received email notification element comprises an "X" graphic received from the associated email application. In some embodiments, the method 1000 further comprises displaying a preview of a received message in response to detecting the first sequence of one or more gestures (FIG. 5A). In some embodiments, the notification element includes a preview, and an expanded preview is displayed in response to detecting the first sequence of one or more gestures. In some embodiments, the method 1000 further comprises displaying the associated application in a second area of the user interface responsive to detecting a second sequence of one or more gestures in the first area of the user interface. For example, selecting the "reply" UI element for a received email notification element causes the associated email application to open in the foreground, in some embodiments. In some embodiments, the method 1000 further comprises displaying two or more additional action option UI elements responsive to detecting a selection of an action option UI element. For example, selecting the "options" UI element in the modal alert interface (FIG. 9A) causes 6 total options to be displayed (FIG. 9B).

Inline Message Reply

In some embodiments, an interactive notification element indicates to a user that the user has received a message, such as a text message or an audio message. To allow the user to respond to the message more efficiently, the interactive notification element provides a method for the user to reply inline to the message via text or audio without opening the corresponding application in the foreground.

FIGS. 11-16 illustrate exemplary user interfaces for displaying interactive notification elements with an inline reply feature in accordance with some embodiments. The user interfaces in these figures are used to illustrate the processes described below, including the processes in FIGS. 10, 17, and 19. In some embodiments, the lock screen interface (FIGS. 5A-5B) and the notification element center interface (FIGS. 7A-7B) do not provide an inline reply feature. Instead, the selection of a "reply" option UI elements displayed in the interactive notification element causes the device to display a modified version of either the home screen banner interface (FIGS. 8A-8B) or the modal alert interface (FIGS. 9A-9B) to provide an inline reply feature.

Figure 11A:
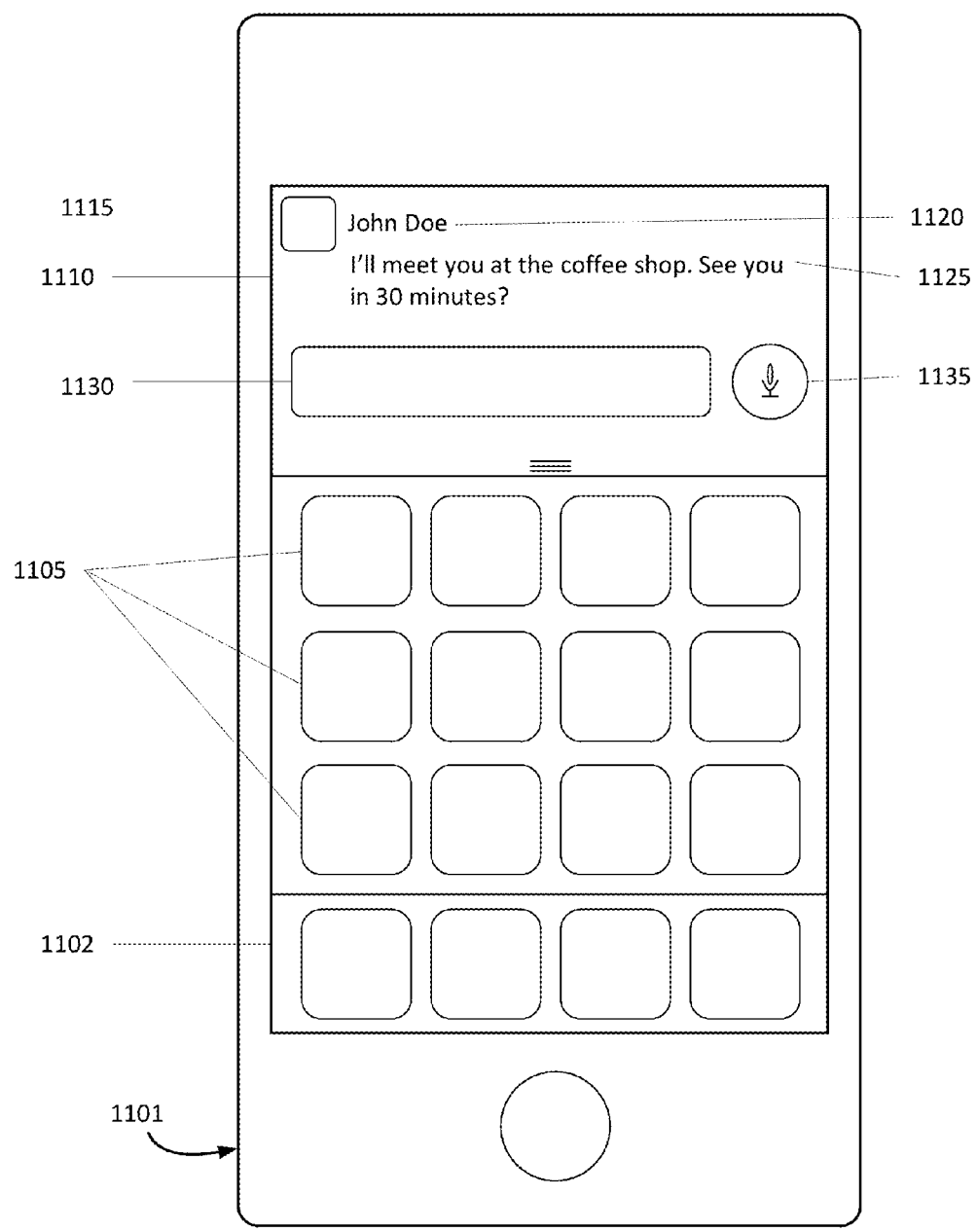
FIG. 11A illustrates an exemplary user interface for a inline reply home screen interface in accordance with some embodiments.

FIG. 11A illustrates a device 1101 displaying a home screen interface on a screen 1102, in accordance with some embodiments. In some embodiments, the device 1101 is the device 100, and the screen 1102 is the screen 112. Similar to FIG. 8A, the home screen interface comprises a plurality of application icons 1105 and an interactive notification element banner 1110. The application icons 1105 are further described above with reference to FIG. 4A. The interactive notification element banner 1110 depicted in FIG. 11A is a text message notification element, and comprises similar elements to the interactive notification element banner 810 depicted in FIG. 8A. However, the interactive notification element banner 1110 depicted in FIG. 11A further comprises an inline reply feature, the inline reply feature comprising a text input field 1130 and a record option UI element 1135.

The record option UI element 1135 comprises a circular outline with a graphic of a microphone. When selected, the text input field 1130 receives text input from a user via a keyboard, in some embodiments. When selected, the record option UI element 1135 causes the device 1101 to receive an audio input from the user, in some embodiments. Responsive to the user selecting the record option UI element 1135, the text input field 1130 and record option UI element 1135 are replaced by a pause option UI element and a waveform element, indicating that the user may now record an audio message. Responsive to the user selecting the pause option element, the device ceases recording the audio message. In some embodiments, the inline reply feature is displayed in the interactive banner notification element response to the corresponding application providing an inline reply option. In some embodiments, the inline reply feature is not displayed for some notification elements that don't warrant a reply, such as a calendar event reminder.

Figure 11B:
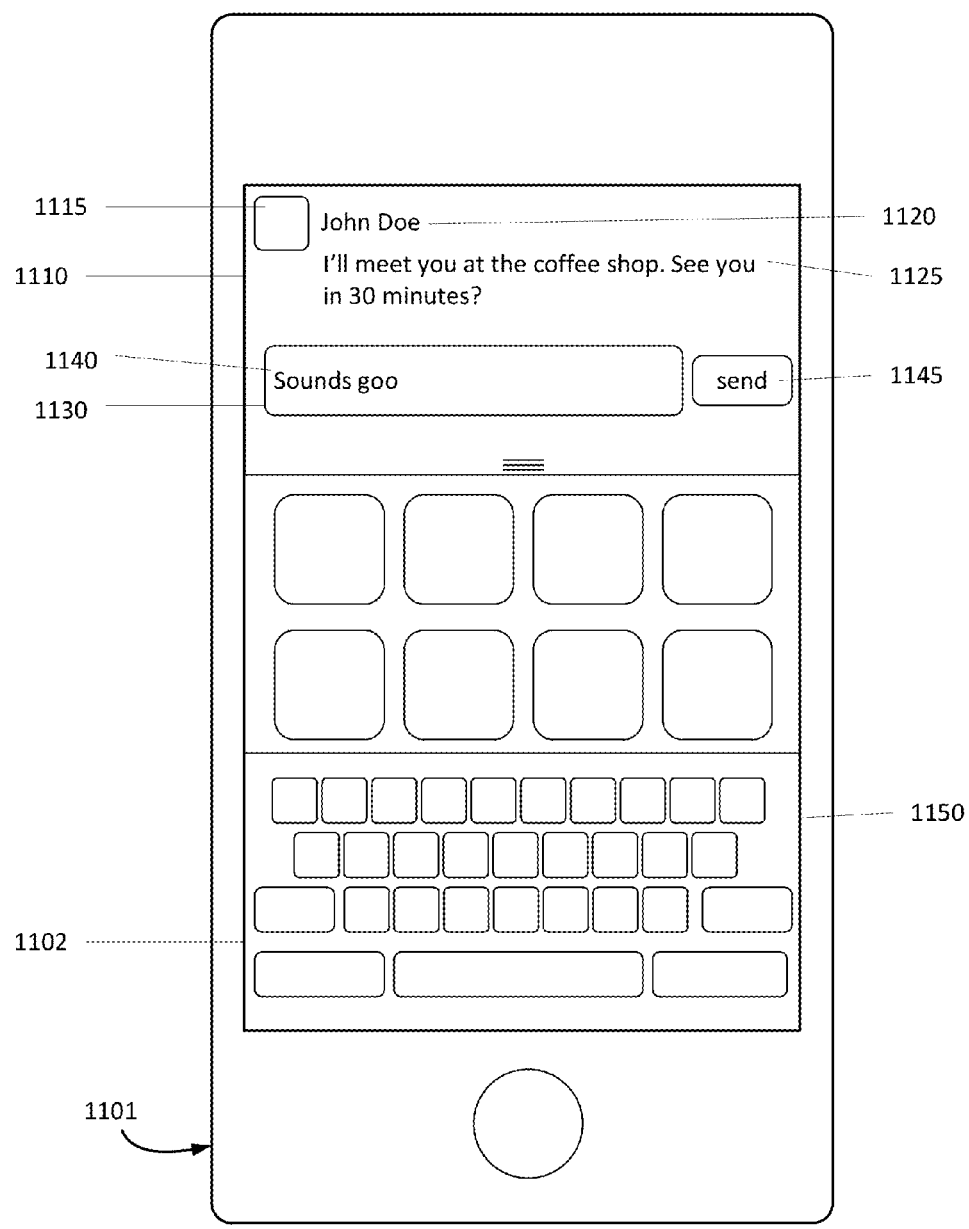
FIG. 11B illustrates an exemplary user interface for an inline reply home screen interface in accordance with some embodiments.

FIG. 11B illustrates the device 801 of FIG. 11A displaying a home screen interface responsive to a user inputting text in the text input field 1130, in accordance with some embodiments. Responsive to the user selecting the text input field 1105, the record option UI element 1135 is replaced by a send option UI element 1145 and a keyboard UI element 1150 is displayed. The keyboard UI element 1150 allows the user to input text 1140, which is displayed in the text input field 1130. When the user is finished typing the reply message, the user selects the send option UI element 1145. Responsive to the user selecting the send option UI element 1145, the interactive banner notification element 1110 slides upward and disappears from the screen 1102, and the keyboard UI element 1150 slides downward and disappears from the screen 112. The user interface depicted in FIGS. 11A-11B allow the user to reply to a received message without opening the associated application in a foreground mode.

Figure 12A:
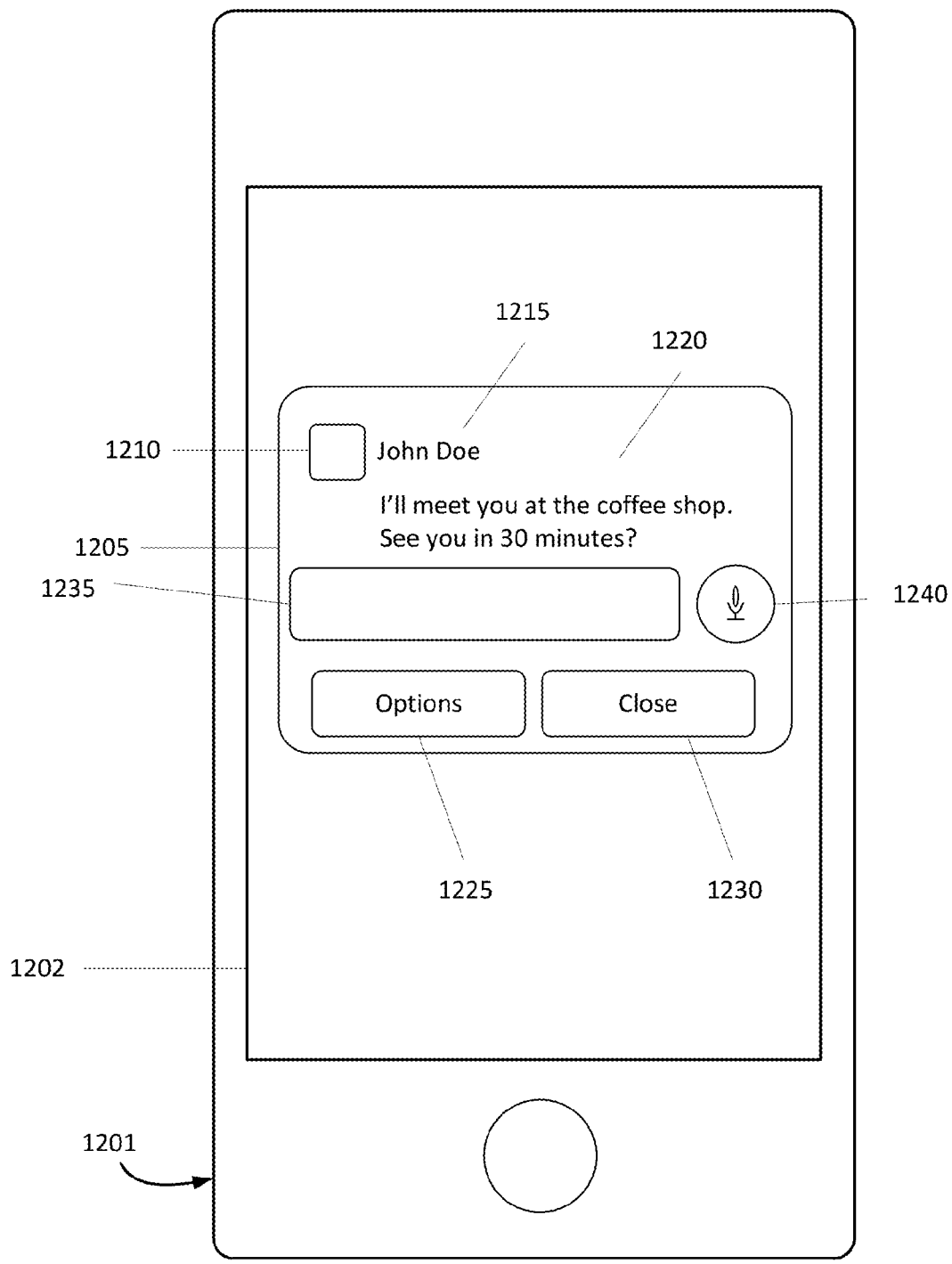
FIG. 12A illustrates an exemplary user interface for an inline reply modal alert interface in accordance with some embodiments.

FIG. 12A illustrates a device 1201 displaying a modal alert interface on a screen 1202, in accordance with some embodiments. In some embodiments, the device 1201 is device 100, and the screen 1202 is screen 112. Similar to FIG. 9A, the modal alert interface comprises a modal alert 1205. The modal alert 1205 is similar to the modal alert 905 described above with reference to FIG. 9A and comprises an icon 1210, a header 1215, a main content 1220, and option UI elements 1225 and 1230. However the modal alert 1205 depicted in FIG. 12A further comprises a text input field 1235 and a record option UI element 1240. The text input field 1235 and record option UI element 1240 function similarly to the text input field 1130 and record option UI element 1135 described with reference to FIG. 11A.

Figure 12B:
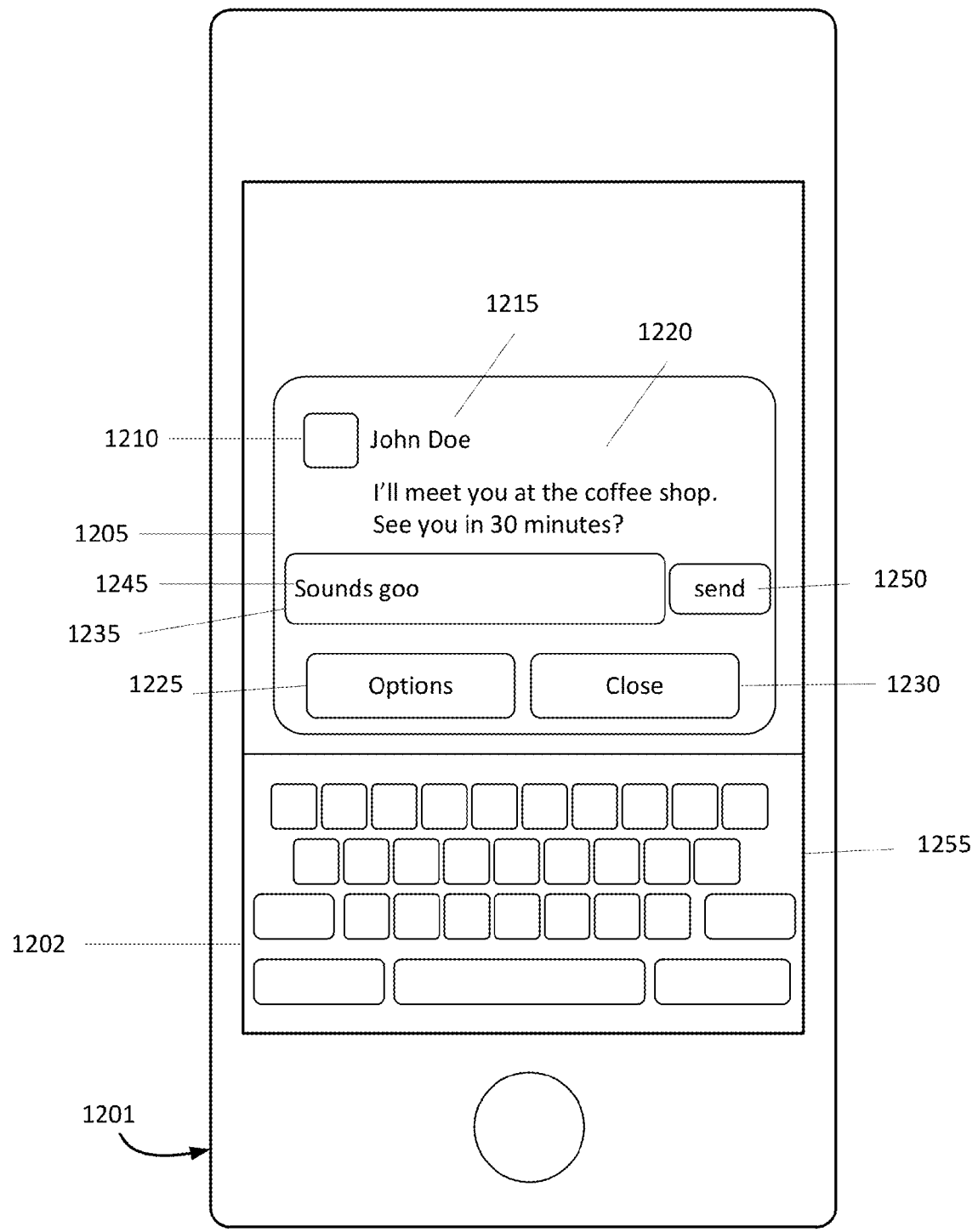
FIG. 12B illustrates an exemplary user interface for an inline reply modal alert interface in accordance with some embodiments.

FIG. 12B illustrates the device 1201 of FIG. 12A displaying a modal alert interface responsive to a user selecting the text input field 1235, in accordance with some embodiments. Responsive to the user selecting the text input field 1235, the record option UI element 1240 is replaced by a send option UI element 1250 and a keyboard UI element 1255 is displayed at the bottom of the screen 112. The keyboard UI element allows the user to input text 1245, which is displayed in the text input field 1235. When the user is finished typing the reply message, the user selects the send option UI element 1250. Responsive to the user selecting the send option UI element 1250, the modal alert interactive notification element 1205 disappears from the screen 1202, and the keyboard UI element 1150 slides downward and disappears from the screen 1202. Referring back to FIG. 12A, responsive to the user selecting the record option UI element 1240, the device 1201 receives an audio input from the user, such as a spoken reply to the received message. Responsive to receiving the audio input from the user, the audio input is provided for transmission in reply to the received message.

Audio Messages

In some embodiments, an interactive notification element indicates to a user that the user has received an audio message, such as a voice message. To allow the user to listen and reply to the message more efficiently, the interactive notification element provides a method for the user to listen to and record a new message without opening the corresponding application in the foreground.

FIGS. 13-16 illustrate exemplary user interfaces for displaying interactive notification elements with an inline reply feature in accordance with some embodiments. The user interfaces in these figures are used to illustrate the processes described below, including the processes in FIGS. 10, 17, and 19.

Figure 13:
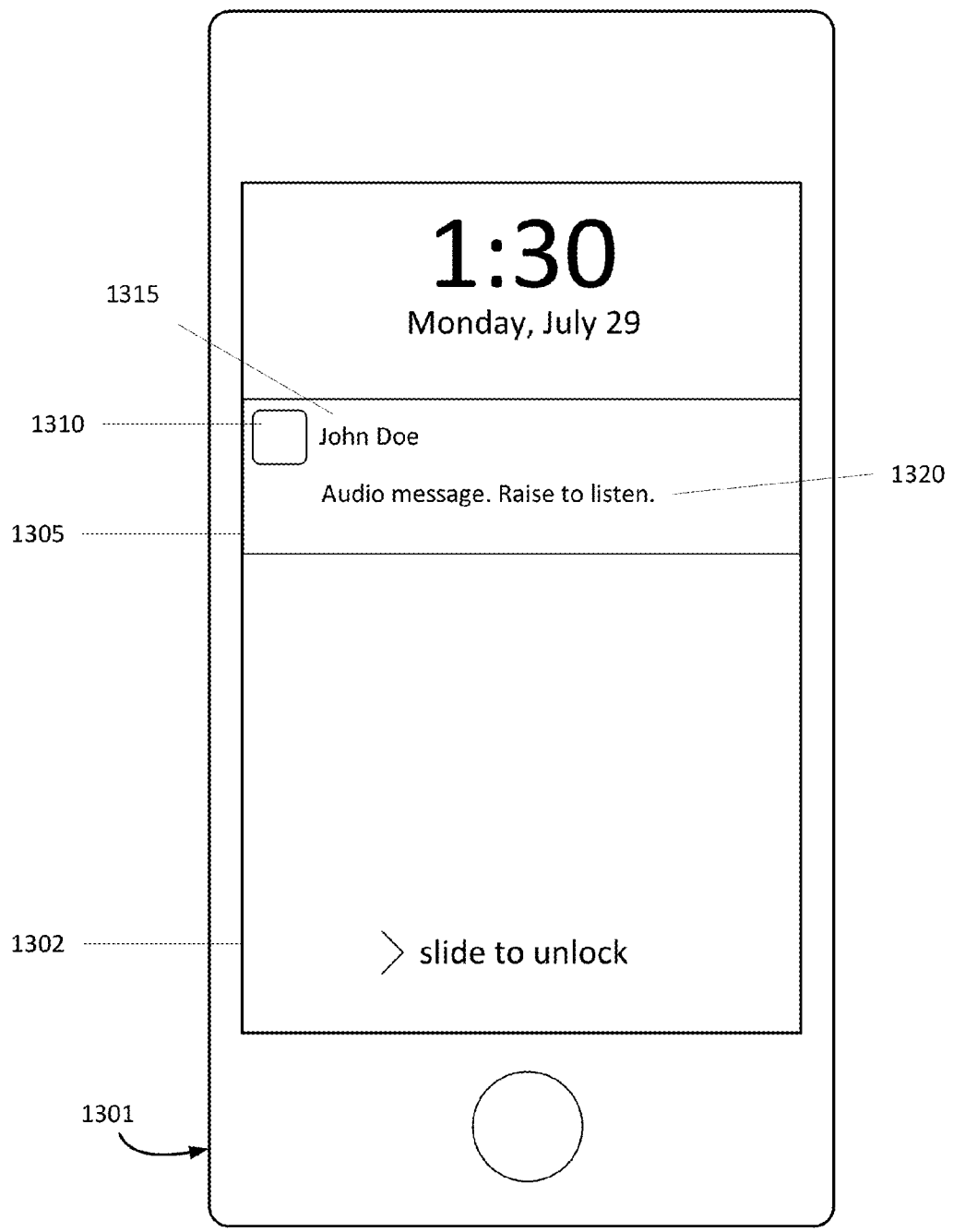
FIG. 13 illustrates an exemplary user interface for an audio message lock screen interface in accordance with some embodiments.
Figure 14:
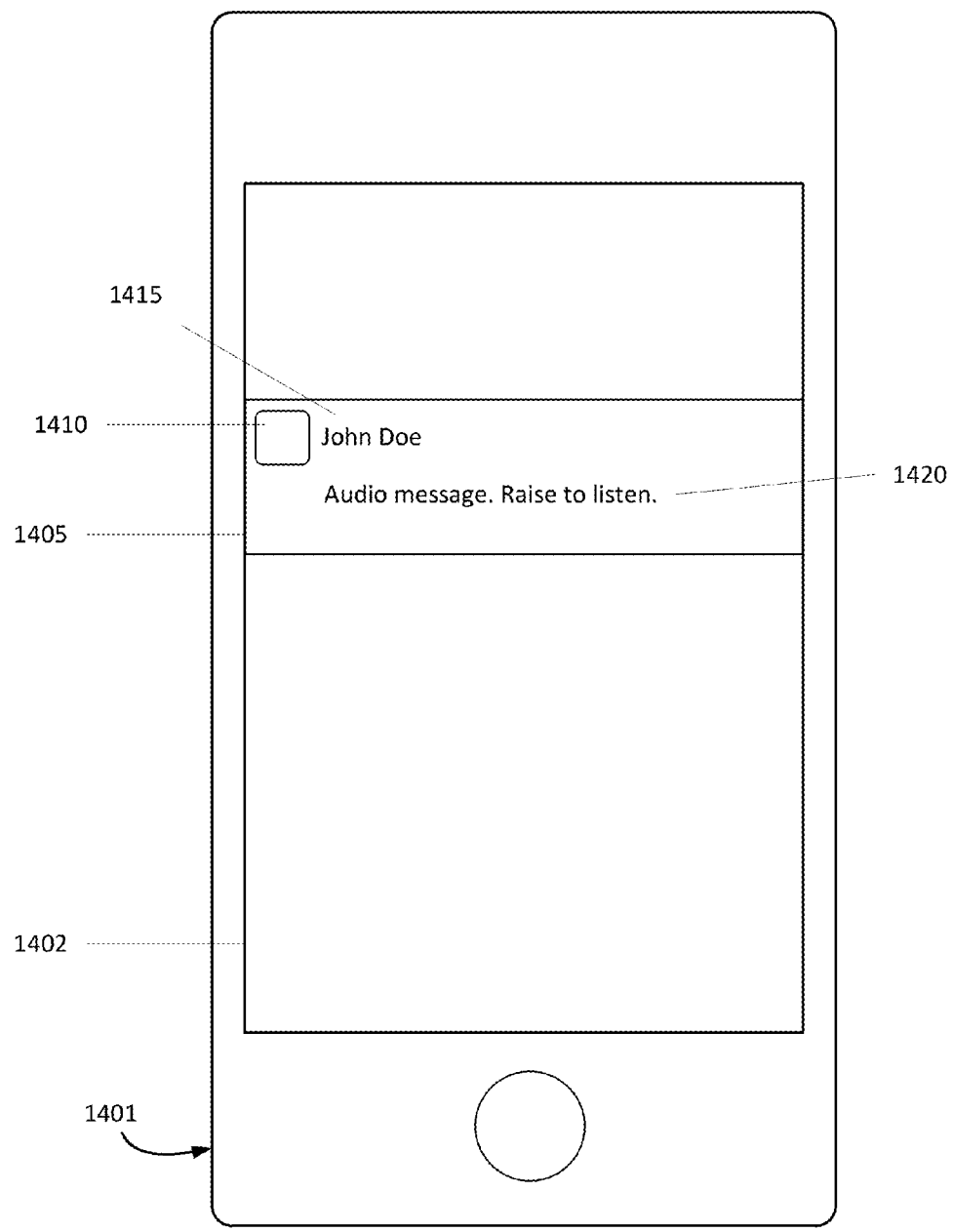
FIG. 14 illustrates an exemplary user interface for an audio message notification element center interface in accordance with some embodiments.

FIG. 13 illustrates a device 1301 displaying a lock screen interface on a screen 1302, as described above with reference to FIG. 5A, in accordance with some embodiments. In some embodiments, the device 1301 is device 100, and the screen 1302 is screen 112. The lock screen interface comprises an interactive notification element 1305, which further comprises an icon 1310, a header 1315, and a main content 1320. The interactive notification element 1305 depicted in FIG. 13 notifies to the user of the device 1301 that an audio message has been received. In some embodiments, the main content 1320 comprises text stating "Audio message. Raise to listen." Responsive to the user raising the device 1301 to his ear, the device 1301 begins playing the audio message. FIG. 14 illustrates a device 1401 displaying a notification element center interface on a screen 1402, as described above with reference to FIG. 7A. In some embodiments, the device 1401 is device 100, and the screen 1402 is screen 112. The notification element center interface comprises an interactive notification element 1405, further comprising an icon 1410, a header 1415, and a notification element content 1420, similar to the lock screen interface described above with reference to FIG. 13. As for the interface depicted in FIG. 13, responsive to the user raising the device 1401 to his ear, the device 1401 begins playing the audio message. In some embodiments, the audio message is played through an earpiece of the device 1401 by default responsive to the user raising the device 1401 to listen to the audio message.

In some embodiments, in response to detecting a predefined gesture (e.g., a right to left swipe gesture) at a location on the touch-sensitive surface that corresponds to the interactive notification element 1305 (e.g., a swipe gesture on the interactive notification element 1305), the device displays one or more options for interacting with the notification (e.g., option A and/or option B as described in greater detail above with reference to FIGS. 5A-5B). In some embodiments one of the options corresponds to a selectable region that, when selected by the user (e.g., in response to a detecting tap gesture at a location on the touch-sensitive surface that corresponds to the selectable region), causes the device start to play back media (e.g., audio and/or video content) corresponding to the notification. In some embodiments, detecting selection of the selectable region (e.g., in response to detecting a tap gesture at a location on the touch-sensitive surface that corresponds to the selectable region) causes the device to pause or stop playback of the media. In some embodiments, when the media is played back in response to detecting a raise gesture, the media is played back through a first speaker (e.g., an "earpiece" speaker of the phone) and when the media is played back in response to interaction with the one or more displayed option(s), the media is played back through a second speaker that is different from the first speaker (e.g., a "speakerphone" speaker at a bottom of the device that is capable of generating louder audio than the "earpiece" speaker).

Figure 15A:
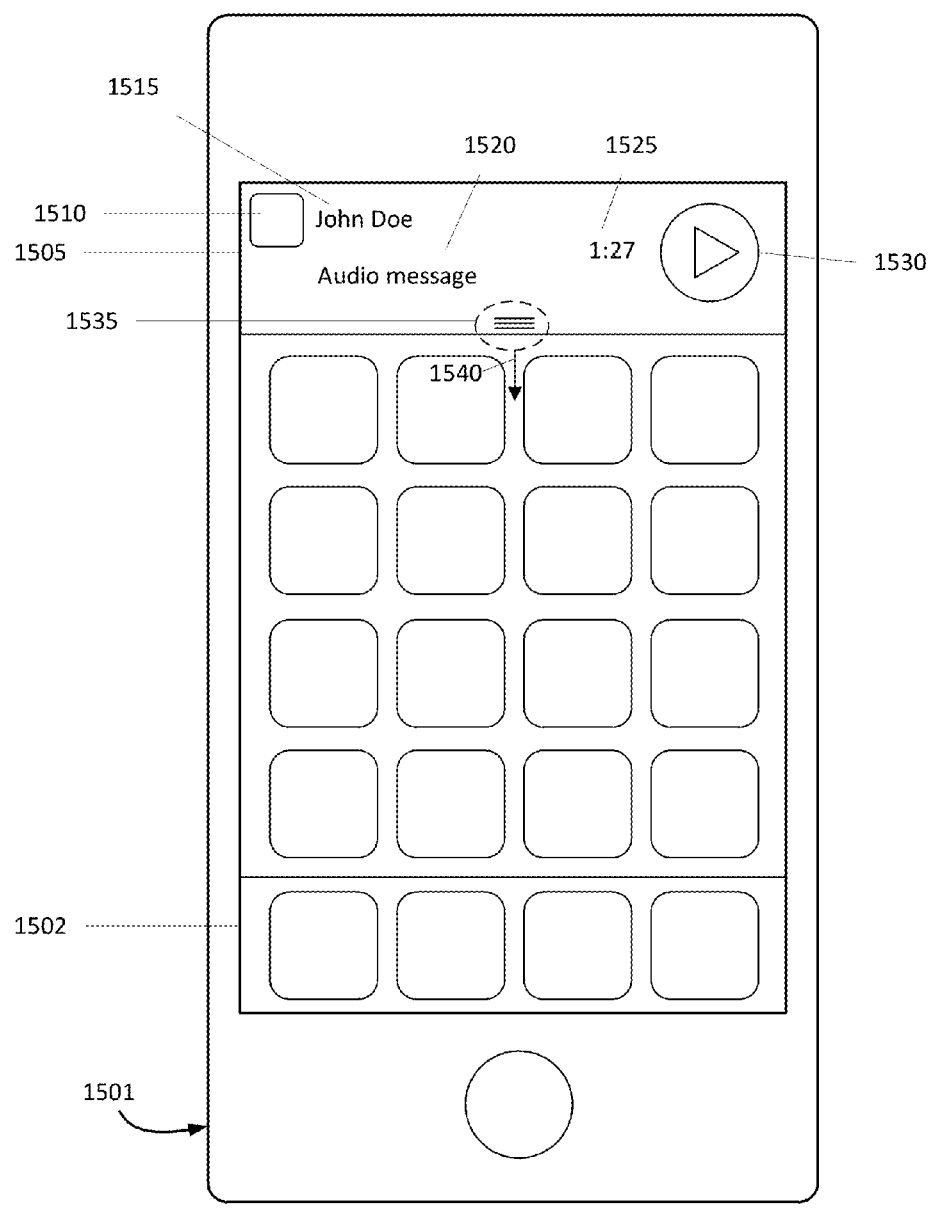
FIG. 15A illustrates an exemplary user interface for an audio message home screen interface in accordance with some embodiments.
Figure 15B:
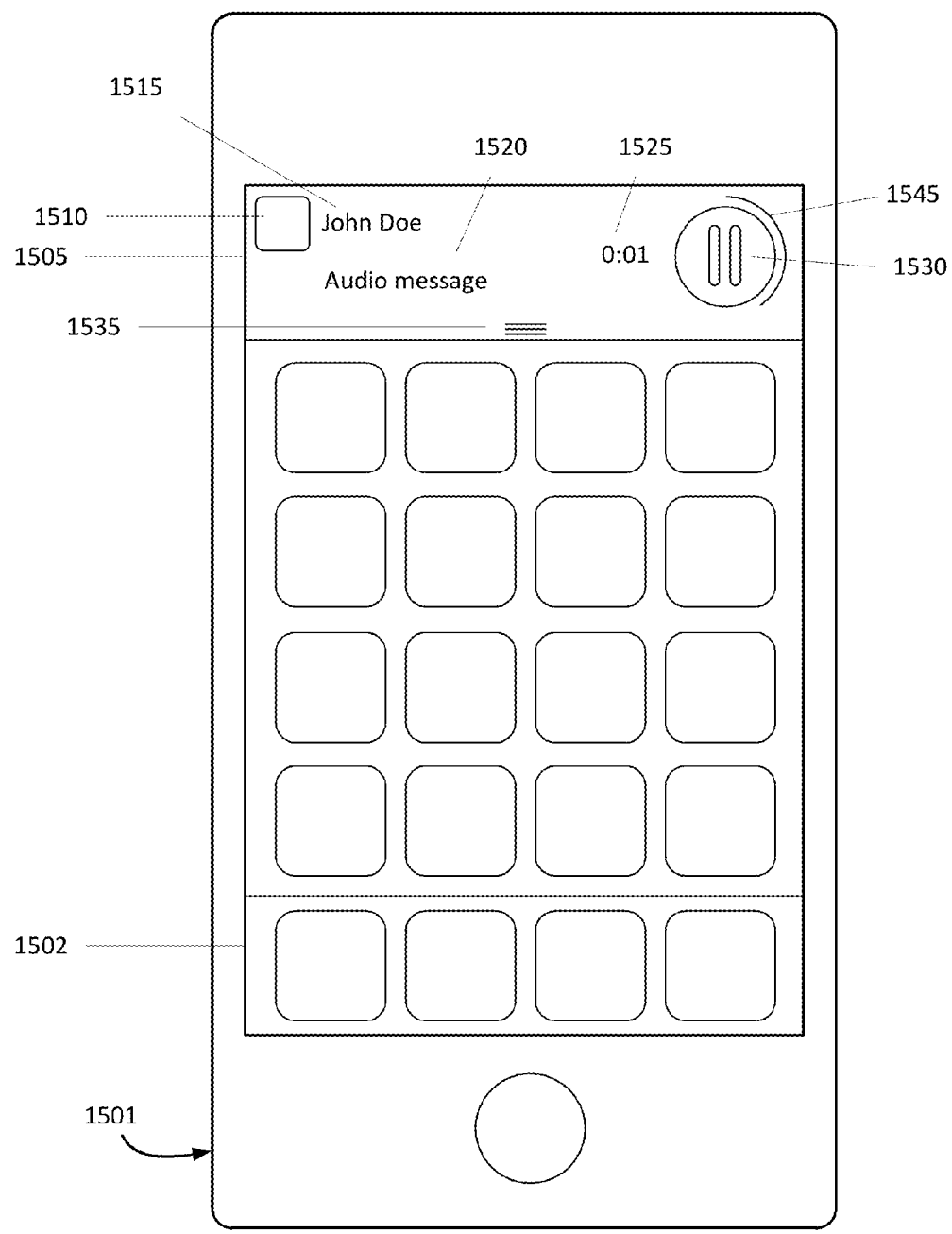
FIG. 15B illustrates an exemplary user interface for an audio message home screen interface in accordance with some embodiments.

FIG. 15A illustrates a device 1501 displaying a home screen interface on a screen 1502, as described above with reference to FIG. 8A. In some embodiments, the device 1501 is device 100, and the screen 1502 is screen 112. The home screen interface comprises an interactive notification element banner 1505, which further comprises an icon 1510, a header 1515, a main content 1520, a time indicator 1525, a play option UI element 1530, and a pull-down UI element 1535. The interactive notification element banner 1505 depicted in FIG. 15A indicates to the user that an audio message has been received. The main content 1515 comprises text stating "audio message." The time indicator 1525 displays to the user the length of the received audio message. The play option UI element 1530 comprises a circular button with a triangular play symbol. Responsive to the user selecting the play option UI element 1530, the device 1501 plays the audio message. In some embodiments, the audio message is played through a speakerphone of the device 1501 by default responsive to the user selecting the play option UI element 1530 to listen to the audio message. Responsive to the user selecting the play option UI element 1530, the time indicator 1525 displays the elapsed time since the audio message has started playing, as depicted in FIG. 15B. Additionally, the play option UI element 1530 changes to display a pause graphic in the circular button, and a progress bar 1545 is displayed circumferentially around the play option UI element 1530. The length of the progress bar 1545 increases proportionally with the elapsed time indicated by the time indicator 1525. Responsive to the user selecting the play option UI element 1530 while the pause graphic is displayed, the audio message stops playing. In order to display the inline reply user interface depicted in FIG. 15C, the user swipes down on the pull-down UI element 1535 as depicted by arrow 1540.

Figure 15C:
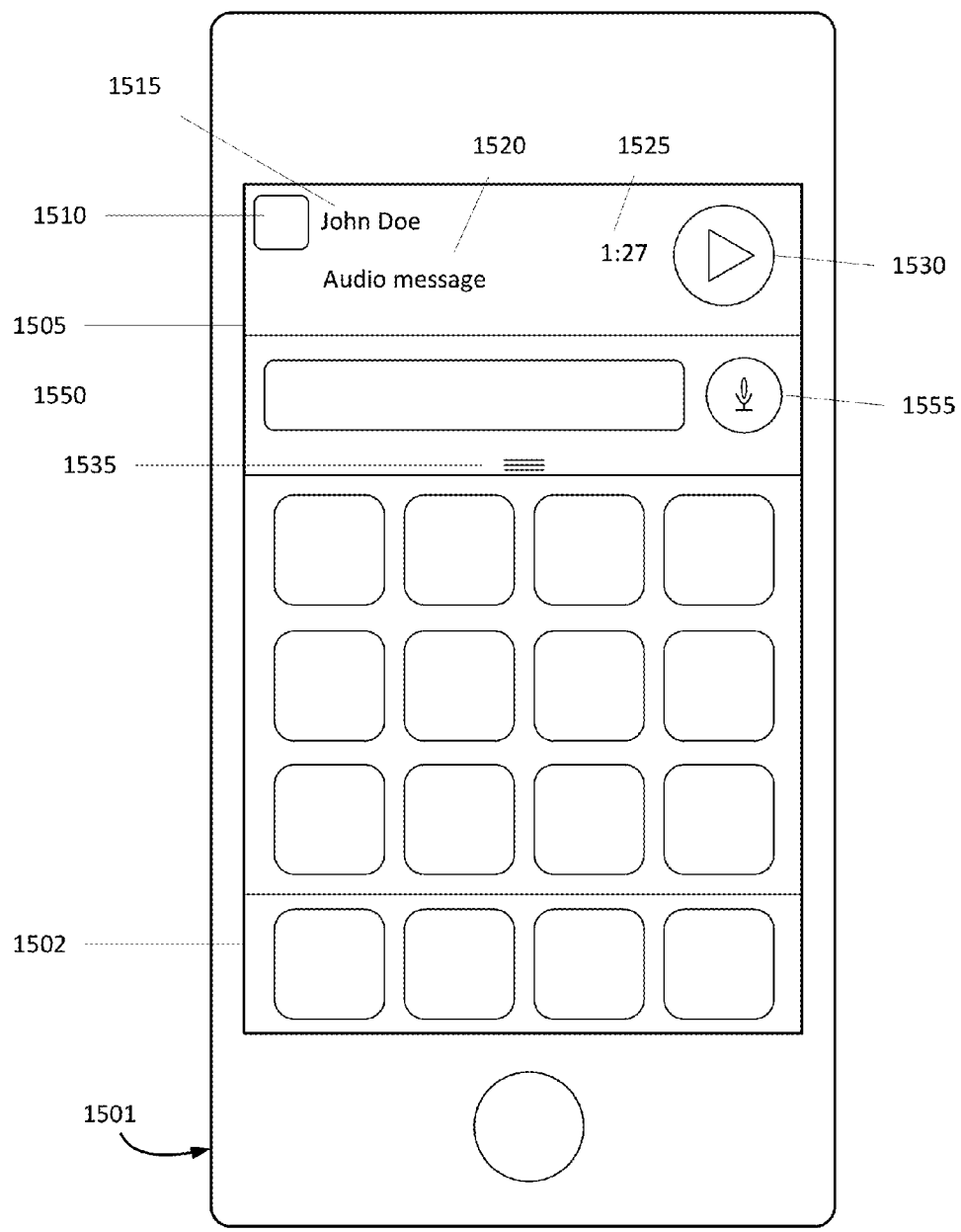
FIG. 15C illustrates an exemplary user interface for an audio message home screen interface in accordance with some embodiments.
Figure 15D:
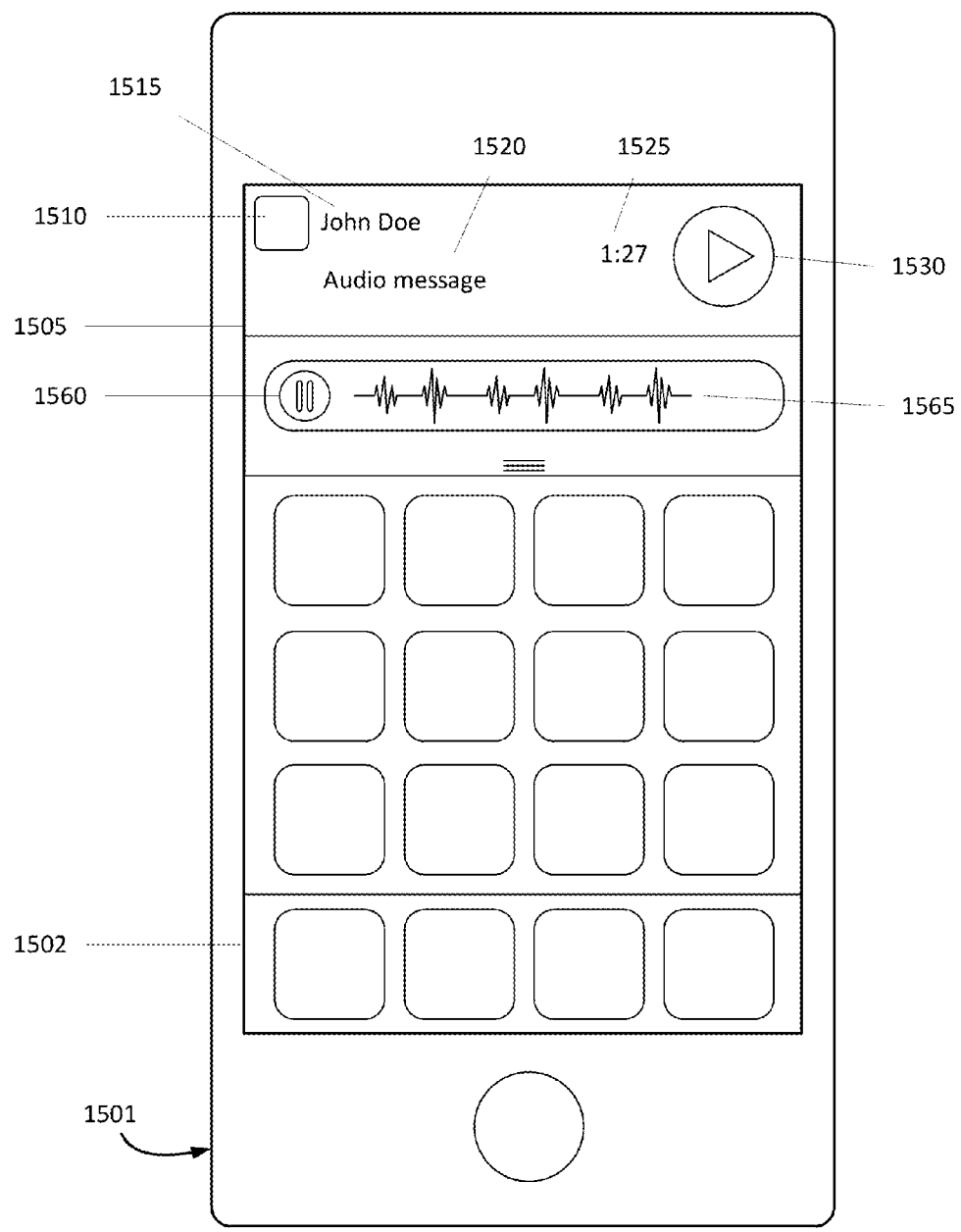
FIG. 15D illustrates an exemplary user interface for an audio message home screen interface in accordance with some embodiments.

FIG. 15C illustrates the device 1501 displaying the user interface of FIG. 15A, responsive to the user swiping down on the pull-down UI element 830, in accordance with some embodiments. In some embodiments, the user of the device 1501 swipes down on the pull-down UI element 1535 in order to reply to the audio message, as depicted by the arrow 1540. Responsive to the user swiping down on the pull-down UI element 1535, the interactive notification element banner 1505 extends downwards to display a text input field 1550 and a record option UI element 1555. The text input field 1550 and record option UI element 1555 are further described above with reference to FIG. 11A and FIG. 11B. FIG. 15D illustrates the device 1501 of FIG. 15A, responsive to the user selecting the record option UI element 1555, in accordance with some embodiments. Responsive to the user selecting the record option UI element 1555, the text input field 1550 and record option UI element 1555 are replaced by a pause option UI element 1560 and a waveform element 1565, indicating that the user may now record an audio message. Responsive to the user selecting the pause option UI element 1560, the device ceases recording the audio message.

Figure 16:
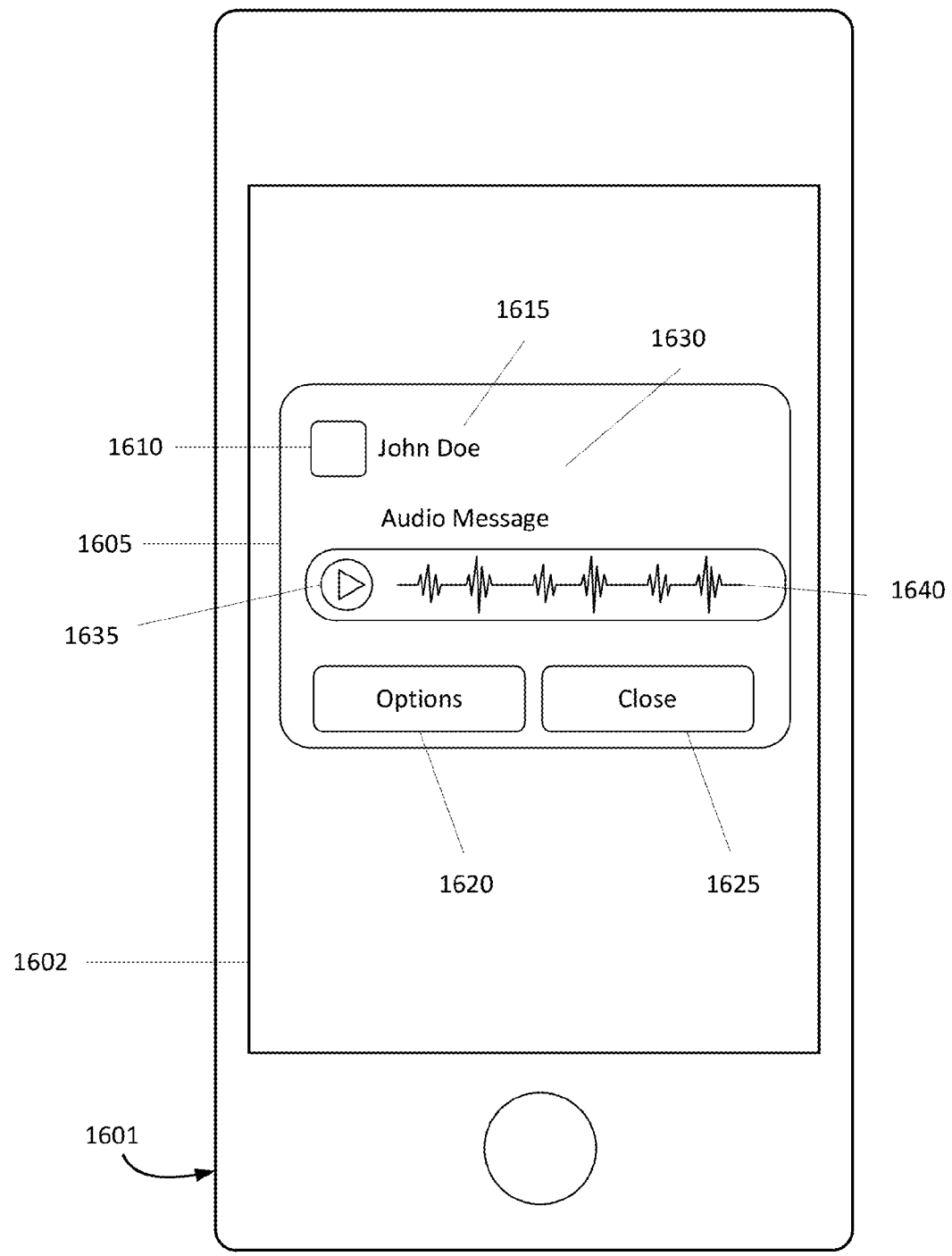
FIG. 16 illustrates an exemplary user interface for an audio message modal alert interface in accordance with some embodiments.

FIG. 16 illustrates a device 1601 displaying a modal alert interface on a screen 1602, as described above with reference to FIG. 9A, in accordance with some embodiments. In some embodiments, the device 1601 is device 100, and the screen 1602 is screen 112. The modal alert 1605 comprises an icon 1610, a header 1615, an options UI element 1620, a close UI element 1625, and content 1630 similar to the elements described above with reference to FIG. 9A. In some embodiments, if the modal alert 1605 is a notification element for a received audio message, the modal alert 1605 will further comprise a play option UI element 1635 and a waveform graphic 1640 to indicate to the user that the received message is an audio message. Responsive to the user selecting the play option UI element 1635, the audio message begins playing, and the play option UI element displays a pause graphic, as described above with reference to FIG. 15A and FIG. 15B.

Figure 17:
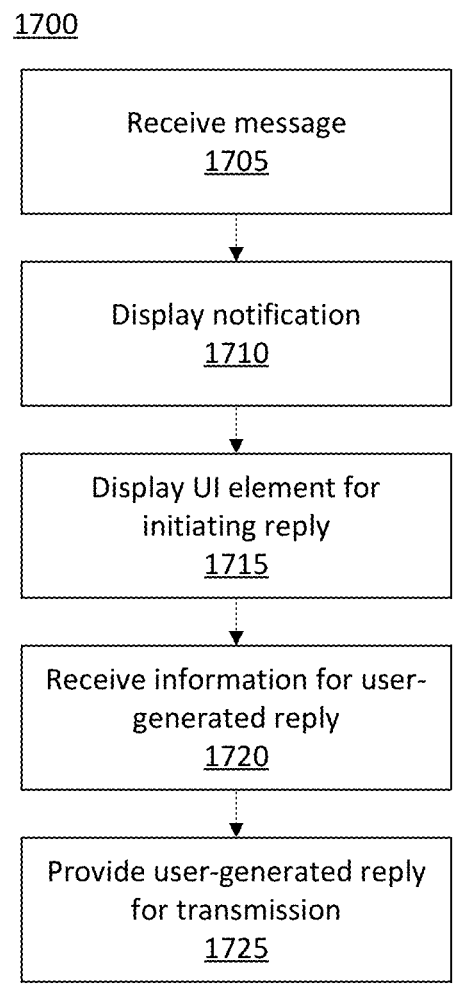
FIG. 17 is a flowchart illustrating a method for providing interactive notification elements with an inline reply feature in accordance with some embodiments.

FIG. 17 is a flowchart illustrating a method 1700 for providing interactive notification elements with an inline reply feature in accordance with some embodiments. First, a message is received 1705. For example, a text message is received. Then, a first notification element is displayed in a first area of a user interface 1710, the first notification element comprising information about the received first message. For example, the notification element can be a lock screen notification element (FIGS. 5A-5B), a notification element center notification element (FIGS. 7A-7B), a home screen notification element (FIGS. 8A-8B), or a modal alert notification element (FIGS. 9A-9B).

While displaying the first notification element, a first UI element is displayed for initiating a reply to the first message 1715. In some embodiments, the user-generated reply comprises a text-based message. For example, the user-generated reply is an email message. In some embodiments, the first UI element is a text entry field (FIG. 11A, text input field 1130). In some embodiments, displaying the first UI element comprises: receiving a sequence of one or more gestures in the first area of the user interface; and responsive to receiving the sequence of one or more gestures, displaying the first UI element in a second area of the user interface. In some embodiments, the user-generated reply comprises an audio message. For example, a user can reply to a received text message by recording a spoken audio message. In some embodiments, if the received message is an audio message, the method 1700 further comprises while displaying the first notification element, responsive to detecting a raising motion of the electronic device, playing the audio message. In some embodiments, the information for the user-generated reply is received without displaying an application in a second area of the user interface. Then, responsive to receiving a selection of the first UI element, information corresponding to a user-generated reply to the first message is received 1720.

Finally, responsive to receiving a send input, the user-generated reply is provided for transmission 1725. In some embodiments, receiving a send input comprises receiving a selection of a second UI element. For example, the second UI element is a "send" UI element (FIG. 11B, send UI element 1145). In some embodiments, receiving a send input comprises detecting a lowering motion of the electronic device. In some embodiments, the method 1700 further comprises responsive to providing the user-generated reply for transmission, ceasing to display the first notification element in the first area of the user interface. For example, as described above with reference to FIG. 11B, the first notification element disappears from the screen of the device after the user selects the "send" UI element. In some embodiments, the method 1700 further comprises: while displaying the first notification element, receiving a second message; inserting the second message into a notification element queue; and responsive to providing the user-generated reply for transmission: retrieving the second message from the notification element queue, and displaying a second notification element in the first area of the user interface, the notification element comprising information about the received second message. For example, while a notification element for a first text message is displayed, a second text message is received. The notification element for the second text message is not displayed until the user replies to the first text message. In some embodiments, an indication is displayed that the second message was received. In some embodiments, the method 1700 further comprises: while displaying the first notification element, receiving a second message; determining the second message is associated with the first message; and displaying a second notification element in the first area of the user interface, the notification element comprising information about the received second message. For example, while a notification element for a first text message is displayed, a second text message is received that is associated with the first text message (e.g. from the same sender). Then, a notification element for the second text message replaces the notification element for the first text message. In some embodiments, displaying the second notification element comprises maintaining information for the user-generated reply that has already been received. For example, if a user has begun typing a reply to the first received text message, the typed reply is preserved when the second text message notification element is displayed.

In some embodiments, the method 1700 further comprises responsive to receiving a tap input on-an input that corresponds to selection of the first notification element (e.g., a tap input on the notification element), displaying an associated application in a second area of the user interface. In some embodiments, displaying the full associated application in a second area of the user interface comprises maintaining information for the user-generated reply that has already been received. For example, if a user has begun typing a reply to a received text message, the typed reply is preserved and displayed when the full text message application is opened in the foreground. In some embodiments, the first UI element includes a text entry field and an audio entry button for initiating recording of audio, and the method 1700 further comprises responsive to receiving a selection of the first UI element: in accordance with a determination that the selection includes selection of the text entry field, displaying soft keyboard on the display and replacing the audio entry button with a send button for sending a text message; and in accordance with a determination that the selection includes selection of the audio entry button, initiating recording of audio and replacing the text entry field with a representation of the audio being recorded (e.g., a graphical representation of a waveform representing the audio being recorded).

In some embodiments, the method 1700 further comprises: while displaying the first notification element for the first message, receiving a second message; in response to receiving the second message: in accordance with a determination that the second message is not associated with the first message, delaying displaying a second notification element for the second message until the first notification element has been dismissed. In some embodiments, the method 1700 further comprises while displaying the second notification element, detecting a request to dismiss the first notification element (e.g., selection of a send message option); and in response to detecting the request to dismiss the first notification element, ceasing to display the first notification element; and after ceasing to display the first notification element, displaying the second notification element. In some embodiments, the method 1700 further comprises in response to receiving the second message, in accordance with a determination that the second message is associated with the first message, updating the first notification element to indicate that the second message has been received. In some embodiments, updating the first notification element includes displaying an indicator that another related message has been received. In some embodiments, updating the first notification element includes displaying an indicator of a number of related messages that have been received. In some embodiments, updating the first notification element includes displaying a portion of the content of the second message in the first notification element.

Notification Element Categories and Contexts

In some embodiments, the action options displayed with an interactive notification element changes depending on a notification element category, a notification element context, or a combination of both. A notification element category is a type of notification element for a specific application that corresponds to a defined set of actions. In some embodiments, the application defines notification element categories and maps actions to each notification element category. For example, an email application defines an "email received" category, in some embodiments. The email application maps a read action, a reply action, a mark-as-unread action, and a delete action to the "email received" notification element category, in some embodiments. Thus, when an interactive notification element is displayed to alert the user of a new email message that has been received, a read option, a reply option, a mark-as-unread option, and a delete option are displayed with the interactive notification element. As another example, a social networking application defines several notification element categories, including "message received," "photo tag," "friend request," and "wall post" categories, in some embodiments. The social networking application maps an accept action, a decline action, and an ignore action to the "friend request" notification element category, in some embodiments. Thus, when an interactive notification element is displayed to alert the user of a new friend request, an accept option, a decline option, and an ignore option are displayed with the interactive notification element. However, the user responds differently to a "wall post" notification element (e.g., the user would not accept or decline something posted to his wall). Therefore, the social networking application maps a different set of actions to the "wall post" notification element category, in some embodiments. As a result, the actions that are displayed with the interactive notification element change based on the notification element category.

A notification element context is the context in which the interactive notification element is displayed. In some embodiments, the notification element context corresponds to the particular user interface which is currently being displayed on the device 100. For example, the notification element context is selected from the group consisting of the lock screen interface, the notification element center interface, the home screen interface, the modal alert interface, and a network observer, in some embodiments. The network observer is further described below with reference to FIG. 18B. The application maps a subset of the notification element category actions to each notification element context, in some embodiments. The actions mapped to each notification element category are determined based in part on the area available on the screen of device 100, in some embodiments. For example, a total of four actions (read, reply, mark as unread, and delete) are mapped to the "email received" notification element category for an email application. However, in the lock screen context, there is only enough area on the display 112 of the device 100 to display two action options. Therefore, the application maps the reply and delete actions to the lock screen context. Thus, an "email received" notification element that is displayed on the lock screen interface displays a reply option and a delete option, in some embodiments. The lock screen context is considered a "minimal" context, in some embodiments, as are the notification element center context and home screen context. On the other hand, in the modal alert context, there is enough area on the display 112 of the device 100 to display all four action options. Therefore, the application maps the read, reply, mark as unread, and delete actions to the modal alert context. Thus, an "email received" notification element that is displayed on the modal alert interface displays all four options, in some embodiments. The modal alert context is considered a "default" context, in some embodiments.

Additionally, in some embodiments, each action is either a foreground action or a background action. In some embodiments, the application defines whether each action is a foreground or a background action. A foreground action is an action that requires the application to open in the foreground on the device 100. For example, an email application defines the reply action for an "email received" notification element to be a foreground action, in some embodiments. Therefore, responsive to the user selecting the reply option displayed in the interactive notification element, the email application opens in the foreground to enable the user to reply to the email. On the other hand, the email application defines the delete action for an "email received" notification element to be a background action, in some embodiments. Therefore, responsive to the user selecting the reply option displayed in the interactive notification element, the email application runs in the background and deletes the email without displaying the application on the screen of the device, responsive to the user selecting the delete option. In some embodiments, background actions are given a time limit to complete the corresponding action. If the time limit is exceeded and the action has not been completed, the action or associated application is terminated, in some embodiments. This serves to preserve processing power of the device 100 and also to preserve battery life.

Notification Element System Block Diagrams

FIG. 18A illustrates a block diagram of a notification element system, in accordance with some embodiments. The notification element system 1800 comprises a third party server 1805, a push service server 1810, an operating system 126, a third party application 1820, and a device display 1825. The third party server 1805 is associated with the third party application 1820 that is installed on a device, such as the device 100. An operating system 1815, such as operating system 126, also is installed and running on the same device 100, in some embodiments.

The third party server 1805 stores and processes information required by the third party application 1820, in some embodiments. For example, for an email application as described above, the corresponding third party server 1805 stores information pertaining to sent and received emails, as is well known in the art. Responsive to the occurrence of an event, such as a new email being received, the third party server 1805 sends a notification element message to the push service server 1810. In some embodiments, the notification element message comprises a device token and a payload. The device token contains information that enables the push service server 1810 to locate the device on which the corresponding third party application 1820 is installed, in some embodiments. The payload specifies the information to be displayed to the user in the notification element, as well as how the notification element will be displayed to the user, in some embodiments. Although only one third party server is depicted in FIG. 18A, the notification element system 1800 comprises two or more third party servers 1805 in other embodiments.

The push service server 1810 is a server that receives notification elements from one or more third party servers 1805, and based on information contained within the notification element, transmits the notification elements to the operating system 1815 of a device 100, in some embodiments. In some embodiments, the push service server 1810 uses the token contained in a notification element from the third party server 1805 to identify what device to send a received notification element to. Then, the push service server 1810 transmits the notification element, including the payload, to the operating system 1815 of the identified device. Although only one push service server 1810 is depicted in FIG. 18A, the notification element system 1800 comprises two or more push service servers 1810 in other embodiments.

The operating system 1815 is installed and runs on a device, such as device 100. The operating system 1815 is further described above with reference to FIG. 1. In some embodiments, the operating system 1815 receives notification elements from the push service server 1810. The operating system 1815 then utilizes the information contained in the notification element to display a notification element on the device display 1825. In some embodiments, the device display 1825 is the screen 112 of the device 100.

In some embodiments, applications operating on a device, such as device 100, send registration messages to the operating system 1815 of the device 100. In some embodiments, a server associated with the application, e.g., third party server 1805, sends the registration messages. Each registration message comprises a notification element category and a mapping of one or more actions associated with the notification element category for one or more notification element contexts. In addition, the registration includes a mapping of each action to either a foreground mode or a background mode, in some embodiments. An example of information contained in a registration message for an email application is shown in the table below.

| Notification element Category | Notification element Context | Action | Foreground/ Background |
|---|---|---|---|
| Received email | Modal Alert | Read | Foreground |
| | | Reply | Foreground |
| | | Mark as read | Background |
| | | Delete | Background |
| | Lock Screen | Reply | Foreground |
| | | Delete | Background |
| | Home Screen | Reply | Foreground |
| | | Delete | Background |
| | Notification element Center | Reply | Foreground |
| | | Delete | Background |
| | Network Observer | Reply | Foreground |
| | | Delete | Background |

The operating system 1815 stores this mapping of notification element categories, notification element contexts, and actions (mapping information), and retrieves this mapping information when a notification element is received, in some embodiments. Therefore, the third party server 1805 advantageously does not have to include the mapping information in every notification element that it sends to the push service server 1810. The third party server 1805 does not have to include the mapping information in every notification element it sends because the operating system 1815 already has the mapping information. When the operating system 1815 receives a notification element from the third party server 1805 (via the push service server 1810), the operating system 1815 can map the received notification element to the mapping information that is mapped to the notification element category. For example, if the operating system 1815 receives a "received email" notification element, the operating system 1815 retrieves the information mapped to the "received email" category, such as the information depicted in the table above. In some embodiments, the operating system 1815 does not receive registration messages from applications. Instead, the third party server 1805 includes the mapping information in every notification element it sends to the push service server 1810.

FIG. 18B illustrates a second block diagram of a notification element system, in accordance with some embodiments. The notification element system 1800 depicted in FIG. 18B is similar to the notification element system 1800 described above with reference to FIG. 18A. The notification element system 1800 comprises a third party server 1805, a push service server 1810, an operating system 1815, and a third party application 1820, as described above. However, instead of the device display 1825 depicted in FIG. 18A, the notification element system 1800 comprises a bulletin board server 1830 that is communicatively connected to a lock screen observer 1835, a notification element center observer 1840, a home screen observer 1845, a modal alert observer 1850, and a network observer 1855. FIG. 18B also illustrates a block diagram of an external system 1856, which comprises a receiver 1860, an external bulletin board server 1865, and an external display 1870.

The bulletin board server 1830 receives notification elements from the operating system 1815, similar to the device display 1825. In some embodiments, the notification elements are referred to as "bulletins." In some embodiments, each bulletin comprises one or more actions, and each action is associated with a unique identifier, a name, and an action command. The unique identifier is used to identify the associated action, and is a unique series of numbers or characters in some embodiments. The name is a string of text that is displayed in a user interface along with an action option UI element corresponding to the action. The action command is the actual command or message sent to the third party application 1820 that causes the third party application 1820 to perform the action. The bulletin board server 1830 transmits the bulletins to one or more observers.

The lock screen observer 1835, notification element center observer 1840, home screen observer 1845, and modal alert observer 1850 receive bulletins from the bulletin board server 1830. In some embodiments, the observers are associated with the notification element contexts described above. For example, the lock screen observer 1835 is associated with the lock screen context, and if the device 100 is currently displaying a lock screen interface, the lock screen observer 1835 receives a bulletin from the bulletin board server and displays an appropriate notification element. In some embodiments, the observers 1835, 1840, 1845, and 1850 are equivalent to the corresponding notification element contexts described above, and thus will not be described in further detail.

The network observer 1855 is an additional notification element context, in some embodiments. The network observer 1855 receives a bulletin from the bulletin board server 1830. However, instead of displaying a notification element on the display 112 of the device 100, the network observer 1855 transmits the bulletin to an external system 1856. In some embodiments, the external system 1856 is an automobile display system. In other embodiments, the external system is any other external display or another device similar to the device 100. In some embodiments, the network observer modifies the bulletin before transmitting it to the external system. For example, the network observer removes the action command from each action in the bulletin, such that each action of the transmitted bulletin only contains the unique identifier and the name. This advantageously allows the network observer 1855 to transmit a smaller quantity of data, which increases transmission times and saves power.

The receiver 1860 of the external system 1856 receives the bulletin transmitted by the network observer 1855. In some embodiments, the external system 1856 comprises an external bulletin board server 1865, which functions similarly to the bulletin board server 1830 of the notification element system 1800. The external bulletin board server 1865 receives the bulletin from the receiver 1860 and directs the bulletin to one or more locations for display. In some embodiments, the external bulletin board server 1865 transmits the bulletin to an external display 1870 for display. For example, if the external system 1856 is an automobile display system, the external display 1870 is a center panel screen of the automobile entertainment system, in some embodiments.

Based on the unique identifier and name associated with each action in the bulletin, the external display 1870 displays a notification element and one or more actions on the external display 1870, in some embodiments. The user can see the names displayed in the notification element, and can make a selection to perform one of the displayed actions. In some embodiments, the notification element and actions displayed on the external display 1870 are similar to the notification element contexts described above, such as the modal alert context, home screen context, lock screen context, or notification element center context. Responsive to the user selecting an action, the external display 1870 transmits the unique identifier associated with the action back to the operating system 1815. In some embodiments, the unique identifier is transmitted back to the operating system 1815 through the external bulletin board server 1865, receiver 1860, and network observer 1855. Responsive to receiving the unique identifier from the external display 1870, the operating system 1815 determines the action associated with the unique identifier and causes the application to perform the associated action. In some embodiments, transmitting only the unique identifier and not the entire bulletin advantageously allows a smaller quantity of data to be transmitted, increases transmission time, and increases battery life. In some embodiments, transmitting only the unique identifier advantageously allows the device 100 to perform the necessary processing functions for performing the actions, and only requires the external system 1856 to receive the notification element, display the notification element and action options, and transmit the ID of the selected action. The external system 1856 is not required to perform the selected actions.

FIG. 19 is a flow diagram illustrating methods of displaying interactive notification elements in accordance with some embodiments. The methods are performed at an electronic device (e.g., device 300, FIG. 3, or portable multifunction device 100, FIG. 1A) with a display and a touch-sensitive surface according to some embodiments. In some embodiments, the display is a touch screen display and the touch-sensitive surface is on the display. In some embodiments, the display is separate from the touch-sensitive surface. Some operations in the methods are, optionally, combined and/or the order of some operations is, optionally, changed.

As described below, the methods depicted in FIG. 19 provides an intuitive way to interact with notification elements and provide commands to applications. The method allows a user to more efficiently interact with an application, thereby creating a more efficient human-machine interface. For battery-operated electronic devices, enabling a user to interact with an application more efficiently conserves power and increases the time between battery charges.

FIG. 19 is a flowchart illustrating a method for providing an interactive notification element on an electronic device, in accordance with some embodiments. First, a registration message is received 1905 from a third party application (such as third party application 1805). In some embodiments, the registration message corresponds to a notification element instance for the third party application. The registration message comprises a notification element category and one or more actions mapped to the notification element category for one or more notification element contexts. For example, a registration message received from an email application comprises a received email category mapped to a reply and a delete action for the lock screen context. In some embodiments, the same registration message from the email application also comprises a reply, read, mark as unread, and delete action mapped to the received email category for the modal alert context. Notification element contexts and categories are described in further detail above. In some embodiments, the registration message of the plurality of registration messages further comprises a mapping of each of the one or more actions to a foreground status or a background status.

The notification element instance is then registered 1910 for the one or more applications. In some embodiments, the operating system 1815 registers, or stores, the received mapping of the actions to each notification element category and context. This enables the application to only send the registration message once, as opposed to sending a new registration message every time a new notification element is to be displayed. By storing the notification element instance, the operating system 1815 can determine what actions to display for a particular notification element category and context that is received, as described below.

An instruction is then received 1915 to provide a notification element. In some embodiments, the instruction comprises a notification element category and a notification element context. For example, an instruction is received from the email application to display a notification element for a received email. The instruction specifies a received email category (the notification element category) and a lock screen context (the notification element context).

Then, the actions mapped to the notification element category and context are identified 1920. In some embodiments, the actions are identified by cross referencing a database of registered notification element instances. For example, the operating system 1815 identifies, based on the stored notification element instance for a received email category in a lock screen context, that the notification element for the received email should display a reply action option and a delete action option.

Finally, the notification element and identified actions are provided for display 1925 to the user. In some embodiments, the operating system 1815 provides the received email notification element, the reply action option, and the delete action option to be displayed on the display 112 of the device 100. In some embodiments, providing the notification element and the identified one or more actions comprises: responsive to the notification element context indicating a lock screen context, displaying a lock screen notification element user interface; responsive to the notification element context indicating a notification element center context, displaying a notification element center user interface; responsive to the notification element context indicating a home screen context, displaying a home screen user interface; and responsive to the notification element context indicating a modal alert context, displaying a modal alert user interface. In some embodiments, the modal alert context allows for displaying a greater number of actions than the lock screen context, notification element center context, and home screen context. In some embodiments, the modal alert context allows a maximum of six actions for display. In some embodiments, the lock screen context, notification element center context, and home screen context allow a maximum of two actions for display.

In some embodiments, the method 1900 further comprises while displaying the notification element: responsive to receiving an input indicating an action mapped to a foreground status, displaying a full application user interface for an application associated with the notification element; and responsive to receiving an input indicating an action mapped to a background status, performing the indicated action without displaying a full application user interface for an application associated with the notification element. In some embodiments, the method 1900 further comprises responsive to the performing of an action mapped to a background status exceeding a time limit, ceasing to perform the action. In some embodiments, the received instruction comprises a notification element context indicative of a network context, and providing the notification element and the identified one or more actions associated with the notification element category for display in the notification element context comprises transmitting the notification element to a network observer and the identified one or more actions. In some embodiments, the network observer transmits the notification element and the identified one or more actions to a third party receiver. In some embodiments, the third party receiver is associated with an automobile entertainment system.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIG. 19 are, optionally, implemented by components depicted in FIGS. 1A-1B. For example, the operations depicted in FIG. 19 are, optionally, implemented by the operating system 126 or other various modules depicted in FIG. 1.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for providing interactive notification elements, comprising:
   at an electronic device with one or more processors and memory:
      receiving a first message associated with a first application;
      displaying as an overlay of a user interface a first notification element, the first notification element comprising information about the received first message;
      while displaying the first notification element as an overlay of the user interface:
         i) displaying as an overlay of the user interface a first UI element for initiating a reply to the first message;
         ii) receiving information including content of a user-generated reply to the first message; and
         iii) in response to receiving the information including content of the user-generated reply to the first message, displaying as an overlay of the user interface a representation of the information including content of the user-generated reply to the first message; and responsive to receiving a send input, providing the user-generated reply for transmission.

2. The method of claim 1, wherein the user-generated reply comprises a text-based message.

3. The method of claim 2, wherein receiving a send input comprises receiving a selection of a second UI element.

4. The method of claim 1, wherein the user-generated reply comprises an audio message.

5. The method of claim 4, wherein receiving a send input comprises detecting a lowering motion of the electronic device.

6. The method of claim 1, further comprising:
responsive to providing the user-generated reply for transmission, ceasing to display the first notification element as an overlay of the user interface.

7. The method of claim 1, wherein the information for the user-generated reply is received by the first application while the first application is running in a background mode that is distinct from a foreground mode.

8. The method of claim 1, further comprising:
while displaying the first notification element, receiving a second message;
responsive to providing the user-generated reply for transmission: displaying a second notification element as an overlay of the user interface, the notification element comprising information about the received second message.

9. The method of claim 8, further comprising:
responsive to receiving the second message, displaying an indication in the first notification element that the second message was received.

10. The method of claim 1, further comprising:
while displaying the first notification element, receiving a second message;
determining the second message is associated with the first message; and
displaying a second notification element as an overlay of the user interface, the notification element comprising information about the received second message.

11. The method of claim 10, wherein displaying the second notification element comprises maintaining information for the user-generated reply that has already been received.

12. The method of claim 1, further comprising:
responsive to receiving an input that corresponds to selection of the first notification element displaying an associated application in a foreground mode user interface.

13. The method of claim 12, wherein displaying the associated application in the foreground mode user interface comprises maintaining information for the user-generated reply that has already been received.

14. The method of claim 1, wherein the first UI element is a text entry field.

15. The method of claim 14, wherein displaying the first UI element comprises:
receiving a sequence of one or more gestures in a first area of the user interface; and
responsive to receiving the sequence of one or more gestures, displaying the first UI element in a second area of the user interface.

16. The method of claim 14, wherein:
the first UI element includes a text entry field and an audio entry button for initiating recording of audio; and
responsive to receiving a selection of the first UI element:
in accordance with a determination that the selection includes selection of the text entry field, displaying soft keyboard on the display and replacing the audio entry button with a send button for sending a text message; and
in accordance with a determination that the selection includes selection of the audio entry button, initiating recording of audio and replacing the text entry field with a representation of the audio being recorded.

17. The method of claim 1, wherein the first message is an audio message, the method further comprising:
while displaying the first notification element, responsive to detecting a raising motion of the electronic device, playing the first message.

18. The method of claim 1, further comprising:
while displaying the first notification element for the first message, receiving a second message;
in response to receiving the second message: in accordance with a determination that the second message is not associated with the first message, delaying displaying a second notification element for the second message until the first notification element has been dismissed.

19. The method of claim 18, further comprising:
while displaying the second notification element, detecting a request to dismiss the first notification element; and
in response to detecting the request to dismiss the first notification element, ceasing to display the first notification element; and
after ceasing to display the first notification element, displaying the second notification element.

20. The method of claim 18, further comprising, in response to receiving the second message, in accordance with a determination that the second message is associated with the first message, updating the first notification element to indicate that the second message has been received.

21. A non-transitory computer-readable storage medium storing instructions that, when executed by a processor, cause the processor to:
receive a first message associated with a first application;
display as an overlay of a user interface a first notification element, the first notification element comprising information about the received first message;
while displaying the first notification element as an overlay of the user interface:
  i) display as an overlay of the user interface a first UI element for initiating a reply to the first message;
  ii) receive information including content of a user-generated reply to the first message; and
  iii) in response to receiving the information including content of the user-generated reply to the first message, display as an overlay of the user interface a representation of the information including content of the user-generated reply to the first message; and
responsive to receiving a send input, provide the user-generated reply for transmission.

22. A device comprising a processor and a memory, the device configured to:
receive a first message associated with a first application;
display as an overlay of a user interface a first notification element, the first notification element comprising information about the received first message;

while displaying the first notification element as an overlay of the user interface:
  i) display as an overlay of the user interface a first UI element for initiating a reply to the first message;
  ii) receive information including content of a user-generated reply to the first message; and
  iii) in response to receiving the information including content of the user-generated reply to the first message, display as an overlay of the user interface a representation of the information including content of the user-generated reply to the first message; and
responsive to receiving a send input, provide the user-generated reply for transmission.

* * * * *